United States Patent
Vijayan et al.

(10) Patent No.: US 10,740,295 B2
(45) Date of Patent: Aug. 11, 2020

(54) DISTRIBUTED DEDUPLICATED STORAGE SYSTEM

(71) Applicant: Commvault Systems, Inc., Tinton Falls, NJ (US)

(72) Inventors: Manoj Kumar Vijayan, Marlboro, NJ (US); Rajiv Kottomtharayil, Marlboro, NJ (US); Deepak Raghunath Attarde, Marlboro, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 120 days.

(21) Appl. No.: 15/875,896

(22) Filed: Jan. 19, 2018

(65) Prior Publication Data

US 2019/0026305 A1 Jan. 24, 2019

Related U.S. Application Data

(63) Continuation of application No. 14/673,586, filed on Mar. 30, 2015, now Pat. No. 9,898,478, which is a
(Continued)

(51) Int. Cl.
*G06F 17/00* (2019.01)
*G06F 16/174* (2019.01)
(Continued)

(52) U.S. Cl.
CPC ......... *G06F 16/1748* (2019.01); *G06F 3/067* (2013.01); *G06F 11/1453* (2013.01);
(Continued)

(58) Field of Classification Search
CPC .... G06F 16/1748; G06F 16/22; G06F 16/256; G06F 16/137; G06F 16/174; G06F 3/067; G06F 11/1453; H04L 67/02; H04L 67/06
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Armstead et al., "Implementation of a Campus-Wide Distributed Mass Storage Service: The Dream vs. Reality," IEEE, 1995, pp. 190-199.

(Continued)

*Primary Examiner* — Tyler J Torgrimson
(74) *Attorney, Agent, or Firm* — Knobbe Martens Olson & Bear LLP

(57) ABSTRACT

A distributed, deduplicated storage system according to certain embodiments is arranged in a parallel configuration including multiple deduplication nodes. Deduplicated data is distributed across the deduplication nodes. The deduplication nodes can be networked together and communicate with one another according using a light-weight, customized communication scheme (e.g., a scheme based on FTP or HTTP). In some cases, deduplication management information including deduplication signatures and/or other metadata is stored separately from the deduplicated data in deduplication management nodes, improving performance and scalability.

18 Claims, 6 Drawing Sheets

Related U.S. Application Data continuation of application No. 13/324,613, filed on Dec. 13, 2011, now Pat. No. 9,020,900.

(60) Provisional application No. 61/423,040, filed on Dec. 14, 2010.

(51) Int. Cl.

| | | |
|---|---|---|
| *G06F 11/14* | (2006.01) | |
| *G06F 3/06* | (2006.01) | |
| *G06F 16/22* | (2019.01) | |
| *G06F 16/13* | (2019.01) | |
| *G06F 16/25* | (2019.01) | |
| *H04L 29/08* | (2006.01) | |

(52) U.S. Cl.
CPC .......... *G06F 16/137* (2019.01); *G06F 16/174* (2019.01); *G06F 16/22* (2019.01); *G06F 16/256* (2019.01); *H04L 67/02* (2013.01); *H04L 67/06* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiffler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,333,315 A | 7/1994 | Saether et al. |
| 5,347,653 A | 9/1994 | Flynn et al. |
| 5,403,639 A | 4/1995 | Belsan |
| 5,410,700 A | 4/1995 | Fecteau et al. |
| 5,420,996 A | 5/1995 | Aoyagi |
| 5,448,724 A | 9/1995 | Hayashi et al. |
| 5,454,099 A | 9/1995 | Myers et al. |
| 5,491,810 A | 2/1996 | Allen |
| 5,495,607 A | 2/1996 | Pisello et al. |
| 5,499,367 A | 3/1996 | Bamford et al. |
| 5,504,873 A | 4/1996 | Martin et al. |
| 5,544,345 A | 8/1996 | Carpenter et al. |
| 5,544,347 A | 8/1996 | Yanai et al. |
| 5,559,957 A | 9/1996 | Balk |
| 5,559,991 A | 9/1996 | Kanfi |
| 5,619,644 A | 4/1997 | Crockett et al. |
| 5,625,793 A | 4/1997 | Mirza |
| 5,638,509 A | 6/1997 | Dunphy et al. |
| 5,642,496 A | 6/1997 | Kanfi |
| 5,673,381 A | 9/1997 | Huai et al. |
| 5,699,361 A | 12/1997 | Ding et al. |
| 5,720,026 A | 2/1998 | Uemura |
| 5,729,743 A | 3/1998 | Squibb |
| 5,732,240 A | 3/1998 | Caccavale |
| 5,751,997 A | 5/1998 | Kullick et al. |
| 5,758,359 A | 5/1998 | Saxon |
| 5,761,677 A | 6/1998 | Senator et al. |
| 5,764,972 A | 6/1998 | Crouse et al. |
| 5,765,173 A | 6/1998 | Cane et al. |
| 5,778,395 A | 7/1998 | Whiting et al. |
| 5,790,828 A | 8/1998 | Jost |
| 5,812,398 A | 9/1998 | Nielsen |
| 5,813,008 A | 9/1998 | Benson et al. |
| 5,813,009 A | 9/1998 | Johnson et al. |
| 5,813,017 A | 9/1998 | Morris |
| 5,875,478 A | 2/1999 | Blumenau |
| 5,875,481 A | 2/1999 | Ashton |
| 5,878,408 A | 3/1999 | Van Huben |
| 5,887,134 A | 3/1999 | Ebrahim |
| 5,901,327 A | 5/1999 | Ofek |
| 5,907,672 A | 5/1999 | Matze |
| 5,924,102 A | 7/1999 | Perks |
| 5,930,831 A | 7/1999 | Marsh et al. |
| 5,940,833 A | 8/1999 | Benson |
| 5,950,205 A | 9/1999 | Aviani, Jr. |
| 5,956,519 A | 9/1999 | Wise |
| 5,974,563 A | 10/1999 | Beeler, Jr. |
| 5,990,810 A | 11/1999 | Williams |
| 6,021,415 A | 2/2000 | Cannon et al. |
| 6,026,414 A | 2/2000 | Anglin |
| 6,038,379 A | 3/2000 | Fletcher et al. |
| 6,052,735 A | 4/2000 | Ulrich et al. |
| 6,076,148 A | 6/2000 | Kedem et al. |
| 6,094,416 A | 7/2000 | Ying |
| 6,131,095 A | 10/2000 | Low et al. |
| 6,131,190 A | 10/2000 | Sidwell |
| 6,148,412 A | 11/2000 | Cannon et al. |
| 6,154,787 A | 11/2000 | Urevig et al. |
| 6,161,111 A | 12/2000 | Mutalik et al. |
| 6,163,856 A | 12/2000 | Dion |
| 6,167,402 A | 12/2000 | Yeager |
| 6,212,512 B1 | 4/2001 | Barney et al. |
| 6,260,069 B1 | 7/2001 | Anglin |
| 6,269,431 B1 | 7/2001 | Dunham |
| 6,275,953 B1 | 8/2001 | Vahalia et al. |
| 6,286,084 B1 | 9/2001 | Wexler et al. |
| 6,289,432 B1 | 9/2001 | Ault et al. |
| 6,301,592 B1 | 10/2001 | Aoyama et al. |
| 6,324,581 B1 | 11/2001 | Xu et al. |
| 6,328,766 B1 | 12/2001 | Long |
| 6,330,570 B1 | 12/2001 | Crighton |
| 6,330,642 B1 | 12/2001 | Carteau |
| 6,343,324 B1 | 1/2002 | Hubis et al. |
| RE37,601 E | 3/2002 | Eastridge et al. |
| 6,353,878 B1 | 3/2002 | Dunham |
| 6,356,801 B1 | 3/2002 | Goodman et al. |
| 6,366,986 B1 | 4/2002 | St. Pierre |
| 6,366,988 B1 | 4/2002 | Skiba |
| 6,374,336 B1 | 4/2002 | Peters |
| 6,389,432 B1 | 5/2002 | Pothapragada et al. |
| 6,397,308 B1 | 5/2002 | Ofek |
| 6,418,478 B1 | 7/2002 | Ignatius et al. |
| 6,421,711 B1 | 7/2002 | Blumenau et al. |
| 6,425,057 B1 | 7/2002 | Cherkasova et al. |
| 6,438,368 B1 | 8/2002 | Phillips |
| 6,487,561 B1 | 11/2002 | Ofek et al. |
| 6,496,850 B1 | 12/2002 | Bowman-Amuah |
| 6,519,679 B2 | 2/2003 | Devireddy et al. |
| 6,538,669 B1 | 3/2003 | Lagueux, Jr. et al. |
| 6,542,972 B2 | 4/2003 | Ignatius et al. |
| 6,557,030 B1 | 4/2003 | Hoang |
| 6,557,089 B1 | 4/2003 | Reed |
| 6,564,228 B1 | 5/2003 | O'Connor |
| 6,625,623 B1 | 9/2003 | Midgley et al. |
| 6,658,436 B2 | 12/2003 | Oshinsky et al. |
| 6,658,526 B2 | 12/2003 | Nguyen et al. |
| 6,662,198 B2 | 12/2003 | Satyanarayanan |
| 6,665,815 B1 | 12/2003 | Goldstein |
| 6,704,730 B2 | 3/2004 | Moulton et al. |
| 6,721,767 B2 | 4/2004 | De Meno et al. |
| 6,732,125 B1 | 5/2004 | Autry |
| 6,757,794 B2 | 6/2004 | Cabrera et al. |
| 6,760,723 B2 | 7/2004 | Oshinsky et al. |
| 6,760,812 B1 | 7/2004 | Degenaro et al. |
| 6,779,093 B1 | 8/2004 | Gupta |
| 6,789,161 B1 | 9/2004 | Blendermann |
| 6,799,258 B1 | 9/2004 | Linde |
| 6,810,398 B2 | 10/2004 | Moulton |
| 6,823,377 B1 | 11/2004 | Wu et al. |

(56) References Cited

U.S. PATENT DOCUMENTS

| | | |
|---|---|---|
| 6,865,655 B1 | 3/2005 | Andersen |
| 6,886,020 B1 | 4/2005 | Zahavi |
| 6,912,629 B1 | 6/2005 | West et al. |
| 6,952,758 B2 | 10/2005 | Chron et al. |
| 6,983,351 B2 | 1/2006 | Gibble |
| 7,003,641 B2 | 2/2006 | Prahlad et al. |
| 7,028,096 B1 | 4/2006 | Lee |
| 7,035,880 B1 | 4/2006 | Crescenti et al. |
| 7,065,619 B1 | 6/2006 | Zhu et al. |
| 7,082,441 B1 | 7/2006 | Zahavi |
| 7,085,904 B2 | 8/2006 | Mizuno et al. |
| 7,100,089 B1 | 8/2006 | Phelps |
| 7,103,617 B2 | 9/2006 | Phatak |
| 7,107,298 B2 | 9/2006 | Prahlad et al. |
| 7,107,395 B1 | 9/2006 | Ofek |
| 7,117,246 B2 | 10/2006 | Christenson et al. |
| 7,130,860 B2 | 10/2006 | Pachet |
| 7,130,970 B2 | 10/2006 | Devassy et al. |
| 7,143,091 B2 | 11/2006 | Charnock |
| 7,155,465 B2 | 12/2006 | Lee |
| 7,155,633 B2 | 12/2006 | Tuma |
| 7,162,496 B2 | 1/2007 | Amarendran et al. |
| 7,174,433 B2 | 2/2007 | Kottomtharayil et al. |
| 7,194,454 B2 | 3/2007 | Hansen |
| 7,197,665 B2 | 3/2007 | Goldstein |
| 7,225,210 B2 | 5/2007 | Guthrie, II |
| 7,243,163 B1 | 7/2007 | Friend et al. |
| 7,246,207 B2 | 7/2007 | Kottomtharayil et al. |
| 7,246,272 B2 | 7/2007 | Cabezas et al. |
| 7,272,606 B2 | 9/2007 | Borthakur et al. |
| 7,284,030 B2 | 10/2007 | Ackaouy et al. |
| 7,287,252 B2 | 10/2007 | Bussiere et al. |
| 7,315,923 B2 | 1/2008 | Retnamma et al. |
| 7,343,356 B2 | 3/2008 | Prahlad |
| 7,343,453 B2 | 3/2008 | Prahlad et al. |
| 7,343,459 B2 | 3/2008 | Prahlad |
| 7,346,751 B2 | 3/2008 | Prahlad |
| 7,383,462 B2 | 6/2008 | Osaki et al. |
| 7,389,311 B1 | 6/2008 | Crescenti et al. |
| 7,395,282 B1 | 7/2008 | Crescenti et al. |
| 7,412,583 B2 | 8/2008 | Burton |
| 7,437,388 B1 | 10/2008 | DeVos |
| 7,440,982 B2 | 10/2008 | Lu et al. |
| 7,454,569 B2 | 11/2008 | Kavuri et al. |
| 7,472,238 B1 | 12/2008 | Gokhale et al. |
| 7,472,242 B1 | 12/2008 | Deshmukh et al. |
| 7,490,207 B2 | 2/2009 | Amarendran et al. |
| 7,500,053 B1 | 3/2009 | Kavuri et al. |
| 7,512,595 B1 | 3/2009 | McBride et al. |
| 7,516,186 B1 | 4/2009 | Borghetti et al. |
| 7,519,726 B2 | 4/2009 | Palliyll et al. |
| 7,529,782 B2 | 5/2009 | Prahlad et al. |
| 7,536,291 B1 | 5/2009 | Vijayan Retnamma et al. |
| 7,539,710 B1 | 5/2009 | Haustein et al. |
| 7,543,125 B2 | 6/2009 | Gokhale |
| 7,546,324 B2 | 6/2009 | Prahlad et al. |
| 7,552,358 B1 | 6/2009 | Asgar-Deen et al. |
| 7,568,080 B2 | 7/2009 | Prahlad et al. |
| 7,574,692 B2 | 8/2009 | Herscu |
| 7,577,806 B2 | 8/2009 | Rowan |
| 7,581,077 B2 | 8/2009 | Ignatius et al. |
| 7,584,338 B1 | 9/2009 | Bricker et al. |
| 7,603,386 B2 | 10/2009 | Amarendran et al. |
| 7,606,844 B2 | 10/2009 | Kottomtharayil |
| 7,613,748 B2 | 11/2009 | Brockway et al. |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,631,194 B2 | 12/2009 | Wahlert et al. |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Prahlad et al. |
| 7,664,771 B2 | 2/2010 | Kusters |
| 7,685,126 B2 | 3/2010 | Patel et al. |
| 7,702,782 B1 | 4/2010 | Pai |
| 7,720,841 B2 | 5/2010 | Gu et al. |
| 7,730,113 B1 | 6/2010 | Payette et al. |
| 7,734,669 B2 | 6/2010 | Kottomtharayil et al. |
| 7,734,820 B1 | 6/2010 | Ranade et al. |
| 7,739,235 B2 | 6/2010 | Rousseau |
| 7,743,051 B1 | 6/2010 | Kashyap et al. |
| 7,747,577 B2 | 6/2010 | Cannon et al. |
| 7,747,579 B2 | 6/2010 | Prahlad et al. |
| 7,761,425 B1 | 7/2010 | Erickson et al. |
| 7,797,279 B1 | 9/2010 | Starling et al. |
| 7,801,864 B2 | 9/2010 | Prahlad et al. |
| 7,809,914 B2 | 10/2010 | Kottomtharayil et al. |
| 7,814,074 B2 | 10/2010 | Anglin et al. |
| 7,814,149 B1 | 10/2010 | Stringham |
| 7,822,939 B1 | 10/2010 | Veprinsky et al. |
| 7,827,150 B1 | 11/2010 | Wu et al. |
| 7,831,795 B2 | 11/2010 | Prahlad et al. |
| 7,840,533 B2 | 11/2010 | Prahlad et al. |
| 7,899,871 B1 | 3/2011 | Kumar et al. |
| 7,962,452 B2 | 6/2011 | Anglin et al. |
| 8,074,043 B1 | 12/2011 | Zeis |
| 8,095,756 B1 | 1/2012 | Somavarapu |
| 8,108,446 B1 | 1/2012 | Christiaens |
| 8,108,638 B2 | 1/2012 | Kishi |
| 8,131,669 B2 | 3/2012 | Cannon et al. |
| 8,145,614 B1 | 3/2012 | Zimran et al. |
| 8,156,086 B2 | 4/2012 | Lu et al. |
| 8,170,995 B2 | 5/2012 | Prahlad et al. |
| 8,199,911 B1 | 6/2012 | Tsaur et al. |
| 8,200,638 B1 | 6/2012 | Zheng et al. |
| 8,200,923 B1 | 6/2012 | Healey et al. |
| 8,204,862 B1 | 6/2012 | Paulzagade et al. |
| 8,209,334 B1 | 6/2012 | Doerner |
| 8,224,875 B1 | 7/2012 | Christiaens et al. |
| 8,229,954 B2 | 7/2012 | Kottomtharayil et al. |
| 8,230,195 B2 | 7/2012 | Amarendran et al. |
| 8,261,240 B2 | 9/2012 | Hoban |
| 8,280,854 B1 | 10/2012 | Emmert |
| 8,285,681 B2 | 10/2012 | Prahlad et al. |
| 8,307,177 B2 | 11/2012 | Prahlad et al. |
| 8,352,422 B2 | 1/2013 | Prahlad et al. |
| 8,364,652 B2 | 1/2013 | Vijayan Retnamma et al. |
| 8,370,315 B1 | 2/2013 | Efstathopoulos et al. |
| 8,370,542 B2 | 2/2013 | Lu et al. |
| 8,375,008 B1 | 2/2013 | Gomes |
| 8,375,181 B1 | 2/2013 | Kekre et al. |
| 8,407,190 B2 | 3/2013 | Prahlad et al. |
| 8,468,320 B1 | 6/2013 | Stringham |
| 8,484,162 B2 | 7/2013 | Prahlad et al. |
| 8,510,573 B2 | 8/2013 | Muller et al. |
| 8,527,469 B2 | 9/2013 | Hwang et al. |
| 8,549,350 B1 | 10/2013 | Dutch et al. |
| 8,572,340 B2 | 10/2013 | Vijayan Retnamma et al. |
| 8,577,851 B2 | 11/2013 | Vijayan Retnamma et al. |
| 8,578,109 B2 | 11/2013 | Vijayan Retnamma et al. |
| 8,578,120 B2 | 11/2013 | Attarde et al. |
| 8,595,191 B2 | 11/2013 | Prahlad et al. |
| 8,621,240 B1 | 12/2013 | Auchmoody et al. |
| 8,645,320 B2 | 2/2014 | Prahlad et al. |
| 8,719,264 B2 | 5/2014 | Varadharajan |
| 8,725,688 B2 | 5/2014 | Lad |
| 8,726,242 B2 | 5/2014 | Ngo |
| 8,745,105 B2 | 6/2014 | Erofeev |
| 8,775,823 B2 | 7/2014 | Gokhale et al. |
| 8,849,762 B2 | 9/2014 | Kumarasamy et al. |
| 8,909,980 B1 | 12/2014 | Lewis et al. |
| 8,930,306 B1 | 1/2015 | Ngo et al. |
| 8,938,481 B2 | 1/2015 | Kumarasamy et al. |
| 8,954,446 B2 | 2/2015 | Vijayan Retnamma et al. |
| 9,020,900 B2 | 4/2015 | Vijayan Retnamma et al. |
| 9,092,441 B1 | 7/2015 | Patiejunas et al. |
| 9,098,495 B2 | 8/2015 | Gokhale |
| 9,104,623 B2 | 8/2015 | Vijayan Retnamma et al. |
| 9,110,602 B2 | 8/2015 | Vijayan Retnamma et al. |
| 9,116,850 B2 | 8/2015 | Vijayan Retnamma et al. |
| 9,128,901 B1 | 9/2015 | Nickurak |

(56) References Cited

U.S. PATENT DOCUMENTS

| | | |
|---|---|---|
| 9,171,008 B2 | 10/2015 | Prahlad et al. |
| 9,208,160 B2 | 12/2015 | Prahlad et al. |
| 9,218,374 B2 | 12/2015 | Muller et al. |
| 9,218,375 B2 | 12/2015 | Muller et al. |
| 9,218,376 B2 | 12/2015 | Muller et al. |
| 9,239,687 B2 | 1/2016 | Vijayan Retnamma et al. |
| 9,251,186 B2 | 2/2016 | Muller et al. |
| 9,298,715 B2 | 3/2016 | Kumarasamy et al. |
| 9,298,724 B1 | 3/2016 | Patil et al. |
| 9,323,820 B1 | 4/2016 | Lauinger et al. |
| 9,342,537 B2 | 5/2016 | Kumarasamy et al. |
| 9,405,631 B2 | 8/2016 | Prahlad et al. |
| 9,405,763 B2 | 8/2016 | Prahlad et al. |
| 9,442,806 B1 | 9/2016 | Bardale |
| 9,575,673 B2 | 2/2017 | Mitkar et al. |
| 9,619,480 B2 | 4/2017 | Vijayan et al. |
| 9,633,033 B2 | 4/2017 | Vijayan et al. |
| 9,633,056 B2 | 4/2017 | Attarde et al. |
| 9,639,289 B2 | 5/2017 | Vijayan Retnamma et al. |
| 9,665,591 B2 | 5/2017 | Vijayan et al. |
| 9,678,968 B1 | 6/2017 | Taylor et al. |
| 9,858,156 B2 | 1/2018 | Muller et al. |
| 9,898,225 B2 | 2/2018 | Vijayan et al. |
| 9,898,478 B2 | 2/2018 | Vijayan et al. |
| 9,934,238 B2 | 4/2018 | Mitkar et al. |
| 9,990,253 B1 | 6/2018 | Rajimwale et al. |
| 10,061,663 B2 | 8/2018 | Vijayan et al. |
| 10,126,973 B2 | 11/2018 | Vijayan et al. |
| 10,176,053 B2 | 1/2019 | Muller et al. |
| 10,191,816 B2 | 1/2019 | Vijayan et al. |
| 10,229,133 B2 | 3/2019 | Vijayan et al. |
| 10,255,143 B2 | 4/2019 | Vijayan et al. |
| 10,310,953 B2 | 6/2019 | Vijayan et al. |
| 10,339,106 B2 | 7/2019 | Vijayan et al. |
| 10,380,072 B2 | 8/2019 | Attarde et al. |
| 10,387,269 B2 | 8/2019 | Muller et al. |
| 10,445,293 B2 | 10/2019 | Attarde et al. |
| 10,474,638 B2 | 11/2019 | Mitkar et al. |
| 10,481,824 B2 | 11/2019 | Vijayan et al. |
| 10,481,825 B2 | 11/2019 | Vijayan et al. |
| 10,481,826 B2 | 11/2019 | Vijayan et al. |
| 2001/0052015 A1 | 12/2001 | Lin et al. |
| 2002/0062439 A1 | 5/2002 | Cotugno et al. |
| 2002/0065892 A1 | 5/2002 | Malik |
| 2002/0083055 A1 | 6/2002 | Pachet |
| 2002/0107877 A1 | 8/2002 | Whiting et al. |
| 2002/0133601 A1 | 9/2002 | Kennamer et al. |
| 2002/0143892 A1 | 10/2002 | Mogul |
| 2002/0144250 A1 | 10/2002 | Yen |
| 2002/0169934 A1 | 11/2002 | Krapp et al. |
| 2003/0033308 A1 | 2/2003 | Patel et al. |
| 2003/0084076 A1 | 5/2003 | Sekiguchi et al. |
| 2003/0105716 A1 | 6/2003 | Lorin, Jr. et al. |
| 2003/0115346 A1 | 6/2003 | McHenry et al. |
| 2003/0149750 A1 | 8/2003 | Franzenburg |
| 2003/0172130 A1 | 9/2003 | Fruchtman et al. |
| 2003/0174648 A1 | 9/2003 | Wang et al. |
| 2003/0182310 A1 | 9/2003 | Charnock et al. |
| 2003/0187917 A1 | 10/2003 | Cohen |
| 2003/0188106 A1 | 10/2003 | Cohen |
| 2004/0010562 A1 | 1/2004 | Itonaga |
| 2004/0128442 A1 | 7/2004 | Hinshaw et al. |
| 2004/0148306 A1 | 7/2004 | Moulton et al. |
| 2004/0181519 A1 | 9/2004 | Anwar |
| 2004/0215746 A1 | 10/2004 | McCanne et al. |
| 2004/0230753 A1 | 11/2004 | Amiri et al. |
| 2005/0033756 A1 | 2/2005 | Kottomtharayil et al. |
| 2005/0060643 A1 | 3/2005 | Glass et al. |
| 2005/0066118 A1 | 3/2005 | Perry |
| 2005/0066225 A1 | 3/2005 | Rowan |
| 2005/0108292 A1 | 5/2005 | Burton |
| 2005/0114450 A1 | 5/2005 | DeVos |
| 2005/0117558 A1 | 6/2005 | Angermann et al. |
| 2005/0144202 A1 | 6/2005 | Chen |
| 2005/0204108 A1 | 9/2005 | Ofek et al. |
| 2005/0216659 A1 | 9/2005 | Ogawa et al. |
| 2005/0243609 A1 | 11/2005 | Yang et al. |
| 2005/0246393 A1 | 11/2005 | Coates et al. |
| 2005/0268068 A1 | 12/2005 | Ignatius et al. |
| 2005/0273654 A1 | 12/2005 | Chen et al. |
| 2006/0004808 A1 | 1/2006 | Hsu et al. |
| 2006/0005048 A1 | 1/2006 | Osaki |
| 2006/0010227 A1 | 1/2006 | Atluri |
| 2006/0020660 A1 | 1/2006 | Prasad et al. |
| 2006/0064456 A1 | 3/2006 | Kalthoff et al. |
| 2006/0074957 A1 | 4/2006 | Yamamoto et al. |
| 2006/0089954 A1 | 4/2006 | Anschutz |
| 2006/0095527 A1 | 5/2006 | Malik |
| 2006/0101096 A1 | 5/2006 | Fuerst |
| 2006/0129537 A1 | 6/2006 | Torii |
| 2006/0136685 A1 | 6/2006 | Griv |
| 2006/0167900 A1 | 7/2006 | Pingte et al. |
| 2006/0168318 A1 | 7/2006 | Twiss |
| 2006/0179261 A1 | 8/2006 | Twiss |
| 2006/0179405 A1 | 8/2006 | Chao et al. |
| 2006/0224846 A1 | 10/2006 | Amarendran et al. |
| 2007/0006018 A1 | 1/2007 | Thompson |
| 2007/0038714 A1 | 2/2007 | Sell |
| 2007/0043757 A1 | 2/2007 | Benton et al. |
| 2007/0050526 A1 | 3/2007 | Abe et al. |
| 2007/0067263 A1 | 3/2007 | Syed |
| 2007/0073814 A1 | 3/2007 | Kamat et al. |
| 2007/0156966 A1 | 7/2007 | Sundarrajan et al. |
| 2007/0162462 A1 | 7/2007 | Zhang et al. |
| 2007/0179990 A1 | 8/2007 | Zimran et al. |
| 2007/0179995 A1 | 8/2007 | Prahlad et al. |
| 2007/0192444 A1 | 8/2007 | Ackaouy et al. |
| 2007/0192542 A1 | 8/2007 | Frolund et al. |
| 2007/0192544 A1 | 8/2007 | Frolund et al. |
| 2007/0203937 A1 | 8/2007 | Prahlad et al. |
| 2007/0250670 A1 | 10/2007 | Fineberg et al. |
| 2007/0255758 A1 | 11/2007 | Zheng et al. |
| 2008/0005141 A1 | 1/2008 | Zheng et al. |
| 2008/0005509 A1 | 1/2008 | Smith et al. |
| 2008/0016131 A1 | 1/2008 | Sandorfi et al. |
| 2008/0028149 A1 | 1/2008 | Pardikar et al. |
| 2008/0089342 A1 | 4/2008 | Lansing et al. |
| 2008/0091655 A1 | 4/2008 | Gokhale et al. |
| 2008/0091725 A1 | 4/2008 | Hwang et al. |
| 2008/0098041 A1 | 4/2008 | Chidambaran et al. |
| 2008/0098083 A1 | 4/2008 | Shergill et al. |
| 2008/0133561 A1 | 6/2008 | Dubnicki et al. |
| 2008/0140630 A1 | 6/2008 | Sato et al. |
| 2008/0159331 A1 | 7/2008 | Mace et al. |
| 2008/0229037 A1 | 9/2008 | Bunte et al. |
| 2008/0243879 A1 | 10/2008 | Gokhale et al. |
| 2008/0243914 A1 | 10/2008 | Prahlad et al. |
| 2008/0243953 A1 | 10/2008 | Wu et al. |
| 2008/0243957 A1 | 10/2008 | Prahlad et al. |
| 2008/0243958 A1 | 10/2008 | Prahlad et al. |
| 2008/0244172 A1 | 10/2008 | Kano |
| 2008/0244199 A1 | 10/2008 | Nakamura et al. |
| 2008/0244204 A1* | 10/2008 | Cremelie ............ G06F 11/2097 711/162 |
| 2008/0244205 A1 | 10/2008 | Amano |
| 2008/0250204 A1 | 10/2008 | Kavuri et al. |
| 2008/0256326 A1 | 10/2008 | Patterson et al. |
| 2008/0256431 A1 | 10/2008 | Hornberger |
| 2008/0281908 A1 | 11/2008 | McCanne et al. |
| 2008/0294660 A1 | 11/2008 | Patterson et al. |
| 2008/0294696 A1 | 11/2008 | Frandzel |
| 2008/0313236 A1 | 12/2008 | Vijayakumar et al. |
| 2008/0320151 A1 | 12/2008 | McCanne et al. |
| 2009/0013129 A1 | 1/2009 | Bondurant |
| 2009/0013258 A1 | 1/2009 | Hintermeister et al. |
| 2009/0043767 A1 | 2/2009 | Joshi et al. |
| 2009/0055425 A1 | 2/2009 | Evans et al. |
| 2009/0055471 A1 | 2/2009 | Kozat et al. |
| 2009/0077140 A1 | 3/2009 | Anglin et al. |
| 2009/0138481 A1 | 5/2009 | Chatley et al. |
| 2009/0144416 A1 | 6/2009 | Chatley et al. |
| 2009/0144422 A1 | 6/2009 | Chatley et al. |
| 2009/0171888 A1 | 7/2009 | Anglin |

(56) References Cited

U.S. PATENT DOCUMENTS

| | | | |
|---|---|---|---|
| 2009/0172139 A1* | 7/2009 | Wong | G06F 9/5083 709/223 |
| 2009/0182789 A1 | 7/2009 | Sandorfi et al. | |
| 2009/0183162 A1 | 7/2009 | Kindel et al. | |
| 2009/0204636 A1 | 8/2009 | Li et al. | |
| 2009/0204649 A1 | 8/2009 | Wong et al. | |
| 2009/0210431 A1 | 8/2009 | Marinkovic et al. | |
| 2009/0243846 A1 | 10/2009 | Yuuki | |
| 2009/0254507 A1 | 10/2009 | Hosoya et al. | |
| 2009/0268903 A1 | 10/2009 | Bojinov et al. | |
| 2009/0271454 A1 | 10/2009 | Anglin et al. | |
| 2009/0276454 A1 | 11/2009 | Smith | |
| 2009/0307251 A1 | 12/2009 | Heller et al. | |
| 2009/0319534 A1 | 12/2009 | Gokhale | |
| 2009/0319585 A1 | 12/2009 | Gokhale | |
| 2009/0327625 A1 | 12/2009 | Jaquette et al. | |
| 2010/0005259 A1 | 1/2010 | Prahlad | |
| 2010/0011178 A1 | 1/2010 | Feathergill | |
| 2010/0031086 A1 | 2/2010 | Leppard | |
| 2010/0036887 A1 | 2/2010 | Anglin et al. | |
| 2010/0042790 A1 | 2/2010 | Mondal et al. | |
| 2010/0049926 A1 | 2/2010 | Fuente et al. | |
| 2010/0049927 A1 | 2/2010 | Fuente et al. | |
| 2010/0070478 A1 | 3/2010 | Anglin | |
| 2010/0077161 A1 | 3/2010 | Stoakes et al. | |
| 2010/0082558 A1 | 4/2010 | Anglin et al. | |
| 2010/0082672 A1 | 4/2010 | Kottomtharayil et al. | |
| 2010/0088296 A1 | 4/2010 | Periyagaram et al. | |
| 2010/0094817 A1 | 4/2010 | Ben-Shaul et al. | |
| 2010/0100529 A1 | 4/2010 | Erofeev | |
| 2010/0114833 A1 | 5/2010 | Mu | |
| 2010/0153511 A1 | 6/2010 | Lin et al. | |
| 2010/0169287 A1 | 7/2010 | Klose | |
| 2010/0180075 A1 | 7/2010 | McCloskey et al. | |
| 2010/0198864 A1 | 8/2010 | Ravid et al. | |
| 2010/0223495 A1 | 9/2010 | Leppard | |
| 2010/0250501 A1 | 9/2010 | Mandagere et al. | |
| 2010/0250549 A1 | 9/2010 | Muller et al. | |
| 2010/0250896 A1 | 9/2010 | Matze | |
| 2010/0257142 A1 | 10/2010 | Murphy et al. | |
| 2010/0257346 A1 | 10/2010 | Sosnosky et al. | |
| 2010/0257403 A1* | 10/2010 | Virk | G06F 11/1453 714/15 |
| 2010/0306283 A1 | 12/2010 | Johnson et al. | |
| 2010/0312752 A1 | 12/2010 | Zeis et al. | |
| 2010/0318759 A1 | 12/2010 | Hamilton et al. | |
| 2010/0332454 A1 | 12/2010 | Prahlad et al. | |
| 2011/0010498 A1 | 1/2011 | Lay et al. | |
| 2011/0060940 A1 | 3/2011 | Taylor et al. | |
| 2011/0072291 A1 | 3/2011 | Murase | |
| 2011/0113012 A1 | 5/2011 | Gruhl et al. | |
| 2011/0113013 A1 | 5/2011 | Reddy et al. | |
| 2011/0113016 A1 | 5/2011 | Gruhl et al. | |
| 2011/0119741 A1 | 5/2011 | Kelly et al. | |
| 2011/0153570 A1 | 6/2011 | Kim et al. | |
| 2011/0161723 A1 | 6/2011 | Taleck et al. | |
| 2011/0167221 A1 | 7/2011 | Pangal et al. | |
| 2011/0258161 A1 | 10/2011 | Constantinescu et al. | |
| 2011/0276543 A1 | 11/2011 | Matze | |
| 2011/0289281 A1 | 11/2011 | Spackman | |
| 2011/0302140 A1 | 12/2011 | Gokhale et al. | |
| 2011/0314070 A1 | 12/2011 | Brown et al. | |
| 2011/0314400 A1 | 12/2011 | Mital et al. | |
| 2012/0011101 A1 | 1/2012 | Fang et al. | |
| 2012/0016839 A1 | 1/2012 | Yueh | |
| 2012/0016845 A1 | 1/2012 | Bates | |
| 2012/0078881 A1 | 3/2012 | Crump et al. | |
| 2012/0084272 A1 | 4/2012 | Garces-Erice et al. | |
| 2012/0089574 A1 | 4/2012 | Doerner | |
| 2012/0150818 A1 | 6/2012 | Vijayan Retnamma et al. | |
| 2012/0166403 A1 | 6/2012 | Kim et al. | |
| 2012/0185437 A1 | 7/2012 | Pavlov et al. | |
| 2012/0221817 A1 | 8/2012 | Yueh | |
| 2012/0233417 A1 | 9/2012 | Kalach | |
| 2012/0303622 A1 | 11/2012 | Dean et al. | |
| 2013/0006943 A1 | 1/2013 | Chavda et al. | |
| 2013/0238562 A1 | 9/2013 | Kumarasamy et al. | |
| 2013/0238572 A1 | 9/2013 | Prahlad et al. | |
| 2013/0262396 A1 | 10/2013 | Kripalani et al. | |
| 2013/0339298 A1 | 12/2013 | Muller et al. | |
| 2013/0339310 A1 | 12/2013 | Muller et al. | |
| 2014/0032940 A1 | 1/2014 | Sartirana et al. | |
| 2014/0115287 A1 | 4/2014 | Schnapp et al. | |
| 2014/0181028 A1 | 6/2014 | Prahlad et al. | |
| 2014/0195749 A1 | 7/2014 | Colgrove et al. | |
| 2014/0201142 A1 | 7/2014 | Varadharajan et al. | |
| 2014/0201150 A1 | 7/2014 | Kumarasamy et al. | |
| 2014/0201153 A1 | 7/2014 | Vijayan et al. | |
| 2014/0229451 A1 | 8/2014 | Venkatesh et al. | |
| 2014/0250076 A1 | 9/2014 | Lad | |
| 2014/0258245 A1 | 9/2014 | Estes | |
| 2014/0281758 A1 | 9/2014 | Klein et al. | |
| 2014/0337285 A1 | 11/2014 | Gokhale et al. | |
| 2014/0337664 A1 | 11/2014 | Gokhale et al. | |
| 2015/0012698 A1 | 1/2015 | Bolla et al. | |
| 2015/0088821 A1 | 3/2015 | Blea et al. | |
| 2015/0154220 A1 | 6/2015 | Ngo et al. | |
| 2015/0161015 A1 | 6/2015 | Kumarasamy et al. | |
| 2015/0212893 A1 | 7/2015 | Pawar et al. | |
| 2015/0212894 A1 | 7/2015 | Pawar et al. | |
| 2015/0212895 A1 | 7/2015 | Pawar et al. | |
| 2015/0212896 A1 | 7/2015 | Pawar et al. | |
| 2015/0212897 A1 | 7/2015 | Pawar et al. | |
| 2015/0248466 A1 | 9/2015 | Jernigan, IV et al. | |
| 2015/0261776 A1 | 9/2015 | Attarde et al. | |
| 2015/0269032 A1 | 9/2015 | Muthyala et al. | |
| 2015/0278104 A1 | 10/2015 | Moon et al. | |
| 2015/0347306 A1 | 12/2015 | Gschwind | |
| 2015/0378839 A1 | 12/2015 | Langouev et al. | |
| 2016/0026405 A1 | 1/2016 | Dhuse | |
| 2016/0041880 A1 | 2/2016 | Mitkar et al. | |
| 2016/0042090 A1 | 2/2016 | Mitkar et al. | |
| 2016/0062846 A1 | 3/2016 | Nallathambi et al. | |
| 2016/0065671 A1 | 3/2016 | Nallathambi et al. | |
| 2016/0139836 A1 | 5/2016 | Nallathambi et al. | |
| 2016/0142483 A1 | 5/2016 | Nallathambi et al. | |
| 2016/0154709 A1 | 6/2016 | Mitkar et al. | |
| 2016/0170657 A1 | 6/2016 | Suehr et al. | |
| 2016/0188416 A1 | 6/2016 | Muller et al. | |
| 2016/0196070 A1 | 7/2016 | Vijayan Retnamma et al. | |
| 2016/0266980 A1 | 9/2016 | Muller et al. | |
| 2016/0299818 A1 | 10/2016 | Vijayan Retnamma et al. | |
| 2016/0306707 A1 | 10/2016 | Vijayan Retnamma et al. | |
| 2016/0306708 A1 | 10/2016 | Prahlad et al. | |
| 2016/0306818 A1 | 10/2016 | Vijayan Retnamma et al. | |
| 2016/0350391 A1 | 12/2016 | Vijayan Retnamma et al. | |
| 2017/0031768 A1 | 2/2017 | Sarab | |
| 2017/0083558 A1 | 3/2017 | Vijayan Retnamma et al. | |
| 2017/0083563 A1 | 3/2017 | Vijayan Retnamma et al. | |
| 2017/0090773 A1 | 3/2017 | Vijayan Retnamma et al. | |
| 2017/0090786 A1 | 3/2017 | Parab et al. | |
| 2017/0168903 A1 | 5/2017 | Dornemann et al. | |
| 2017/0185488 A1 | 6/2017 | Kumarasamy et al. | |
| 2017/0192860 A1 | 7/2017 | Vijayan et al. | |
| 2017/0192861 A1 | 7/2017 | Vijayan et al. | |
| 2017/0192866 A1 | 7/2017 | Vijayan et al. | |
| 2017/0192867 A1 | 7/2017 | Vijayan et al. | |
| 2017/0192868 A1 | 7/2017 | Vijayan et al. | |
| 2017/0193003 A1 | 7/2017 | Vijayan et al. | |
| 2017/0199699 A1 | 7/2017 | Vijayan et al. | |
| 2017/0206219 A1 | 7/2017 | Vijayan et al. | |
| 2017/0235647 A1 | 8/2017 | Kilaru et al. | |
| 2017/0242871 A1 | 8/2017 | Kilaru et al. | |
| 2017/0315876 A1 | 11/2017 | Dornquast et al. | |
| 2018/0075055 A1 | 3/2018 | Ngo et al. | |
| 2019/0012237 A1 | 1/2019 | Prahlad et al. | |
| 2019/0179805 A1* | 6/2019 | Prahlad | G06F 3/0649 |
| 2019/0188088 A1 | 6/2019 | Muller et al. | |
| 2019/0205290 A1 | 7/2019 | Vijayan et al. | |
| 2019/0227879 A1 | 7/2019 | Vijayan et al. | |
| 2019/0272220 A1 | 9/2019 | Vijayan et al. | |

(56) References Cited

U.S. PATENT DOCUMENTS

| | | |
|---|---|---|
| 2019/0272221 A1 | 9/2019 | Vijayan et al. |
| 2019/0310968 A1 | 10/2019 | Attarde et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 1995/013580 | 5/1995 |
| WO | WO 99/009480 A1 | 2/1999 |
| WO | WO 1999/012098 | 3/1999 |
| WO | WO 2002/005466 | 1/2002 |
| WO | WO 2006/052872 | 5/2006 |
| WO | WO 2010/013292 A1 | 2/2010 |
| WO | WO 2010/140264 | 12/2010 |
| WO | WO 2012/044366 | 4/2012 |
| WO | WO 2012/044367 | 4/2012 |
| WO | WO 2013/188550 | 12/2013 |

OTHER PUBLICATIONS

Arneson, "Mass Storage Archiving in Network Environments," Digest of Papers, Ninth IEEE Symposium on Mass Storage Systems, Oct. 31, 1988-Nov. 3, 1988, pp. 45-50, Monterey, CA.

Ashton, et al., "Two Decades of policy-based storage management for the IBM mainframe computer", www.research.ibm.com, 19 pages, published Apr. 10, 2003, printed Jan. 3, 2009., www.research.ibm.com, Apr. 10, 2003, pp. 19.

Bhagwat, Extreme Binning: Scalable, Parallel Deduplication for Chunk-based File Backup. IEEE 2009, 9 pages.

Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.

Cohen, Edith, et al.,. "The Age Penalty and Its Effect on Cache Performance." In USITS, pp. 73-84. 2001.

Cohen, Edith, et al.,."Aging through cascaded caches: Performance issues in the distribution of web content." In ACM SIGCOMM Computer Communication Review, vol. 31, No. 4, pp. 41-53. ACM, 2001.

Cohen, Edith, et al.,. "Refreshment policies for web content caches." Computer Networks 38.6 (2002): 795-808.

CommVault Systems, Inc. "Continuous Data Replicator 7.0," Product Data Sheet, 2007.

CommVault Systems, Inc., "Deduplication—How to," http://documentation.commvault.com/commvault/release_8_0_0/books_online_1/english_US/features/single_instance/single_instance_how_to.htm, internet accessed on Jan. 26, 2009, 7 pages.

CommVault Systems, Inc., "Deduplication," http://documentation.commvault.com/commvault/release_8_0_0/books_online_1/english_US/features/single_instance/single_instance.htm, internet accessed on Jan. 26, 2009, 9 pages.

Diligent Technologies HyperFactor, http://www.dilligent.com/products:protecTIER-1:HyperFactor-1, Internet accessed on Dec. 5, 2008, 2 pages.

Dubnicki, et al. "HYDRAstor: A Scalable Secondary Storage." FAST. vol. 9.2009, 74 pages.

Eitel, "Backup and Storage Management in Distributed Heterogeneous Environments," IEEE, 1994, pp. 124-126.

Gait, "The Optical File Cabinet: A Random-Access File system for Write-Once Optical Disks," IEEE Computer, vol. 21, No. 6, pp. 11-22 (1988).

Gray (#2 of 2, pp. 604-609), Jim; Reuter Andreas, Transaction Processing Concepts and Techniques, Morgan Kaufmann Publisher, USA 1994, pp. 604-609.

Guo et al., Building a High-performance Deduplication System, Jun. 15, 2011, retrieved from the Internet at <URL: http://dl.acm.org/citation.cfm?id=2002206>, pp. 1-14.

Huff, KL, "Data Set Usage Sequence Number," IBM Technical Disclosure Bulletin, vol. 24, No. 5, Oct. 1981 New York, US, pp. 2404-2406.

Jander, "Launching Storage-Area Net," Data Communications, US, McGraw Hill, NY, vol. 27, No. 4(Mar. 21, 1998), pp. 64-72.

Kashyap, et al., "Professional Services Automation: A knowledge Management approach using LSI and Domain specific Ontologies", FLAIRS-01 Proceedings, 2001, pp. 300-302.

Kornblum, Jesse, "Identifying Almost Identical Files Using Context Triggered Piecewise Hashing," www.sciencedirect.com, Digital Investigation 3S (2006), pp. S91-S97.

Lortu Software Development, "Kondar Technology-Deduplication," http://www.lortu.com/en/deduplication.asp, Internet accessed on Dec. 5, 2008, 3 pages.

Overland Storage, "Data Deduplication," http://www.overlandstorage.com/topics/data_deduplication.html, Internet accessed on Dec. 5, 2008, 2 pages.

Quantum Corporation, "Data De-Duplication Background: A Technical White Paper," May 2008, 13 pages.

Rosenblum et al., "The Design and Implementation of a Log-Structure File System," Operating Systems Review SIGOPS, vol. 25, No. 5, New York, US, pp. 1-15 (May 1991).

Wei, et al. "MAD2: A scalable high-throughput exact deduplication approach for network backup services." Mass Storage Systems and Technologies (MSST), 2010 IEEE 26th Symposium on. IEEE, 2010, 14 pages.

Wolman et al., On the scale and performance of cooperative Web proxy caching, 1999.

Wu, et al., Load Balancing and Hot Spot Relief for Hash Routing among a Collection of Proxy Caches, 1999.

Final Office Action for Japanese Application No. 2003531581, dated Mar. 24, 2009, 6 pages.

International Search Report and Written Opinion, International Application No. PCT/US2009/58137, dated Dec. 23, 2009, 14 pages.

International Search Report and Written Opinion, International Application No. PCT/US2011/030804, dated Jun. 9, 2011.

International Search Report and Written Opinion, International Application No. PCT/US2011/030814, dated Jun. 9, 2011.

International Search Report and Written Opinion, International Application No. PCT/US2013/045443 dated Nov. 14, 2013, 16 pages.

International Preliminary Report on Patentability, International Application No. PCT/US2013/045443 dated Dec. 16, 2014 11 pages.

Prahlad, et al., U.S. Appl. No. 12/724,292 Now U.S. Pat. No. 8,484,162, filed Mar. 15, 2010, De-Duplication Systems and Methods for Application-Specific Data.

Prahlad, et al., U.S. Appl. No. 13/931,654 Now U.S. Pat. No. 9,405,763, filed Jun. 28, 2013, De-Duplication Systems and Methods for Application-Specific Data.

Prahlad, et al., U.S. Appl. No. 15/198,269 Published as 2016/0306708, filed Jun. 30, 2016, De-Duplication Systems and Methods for Application-Specific Data.

Vijayan, et al., U.S. Appl. No. 12/982,086 Now U.S. Pat. No. 8,577,851, filed Dec. 30, 2010, Content Aligned Block-Based Deduplication.

Vijayan, et al., U.S. Appl. No. 12/982,071 Now U.S. Pat. No. 8,364,652, filed Dec. 30, 2010, Content Aligned Block-Based Deduplication.

Vijayan, et al., U.S. Appl. No. 13/750,105 Now U.S. Pat. No. 9,110,602, filed Jan. 25, 2013, Content Aligned Block-Based Deduplication.

Vijayan, et al., U.S. Appl. No. 14/821,418 Now U.S. Pat. No. 9,619,480, filed Aug. 7, 2015, Content Aligned Block-Based Deduplication.

Vijayan, et al., U.S. Appl. No. 15/449,246 Now U.S. Pat. No. 9,898,225, filed Mar. 3, 2017, Content Aligned Block-Based Deduplication.

(56) References Cited

OTHER PUBLICATIONS

Retnamma, et al., U.S. Appl. No. 13/324,884 Abandoned, filed Dec. 13, 2011, Client-Side Repository in a Networked Deduplicated Storage System.

Retnamma, et al., U.S. Appl. No. 13/324,817 Now U.S. Pat. No. 8,954,446, filed Dec. 13, 2011, Client-Side Repository in a Networked Deduplicated Storage System.

Retnamma, et al., U.S. Appl. No. 13/324,792 Now U.S. Pat. No. 9,116,850, filed Dec. 13, 2011, Client-Side Repository in a Networked Deduplicated Storage System.

Vijayan, et al., U.S. Appl. No. 13/324,848 Now U.S. Pat. No. 9,104,623, filed Dec. 13, 2011, Client-Side Repository in a Networked Deduplicated Storage System.

Vijayan, et al., U.S. Appl. No. 14/673,021 Published as 2015/0205681, filed Mar. 30, 2015, Client-Side Repository in a Networked Deduplicated Storage System.

Vijayan, et al., U.S. Appl. No. 13/324,613 Now U.S. Pat. No. 9,020,900, filed Dec. 13, 2011, Distributed Deduplicated Storage System.

Vijayan, et al., U.S. Appl. No. 14/673,586 Now U.S. Pat. No. 9,898,478, filed Mar. 30, 2015, Distributed Deduplicated Storage System.

Vijayan, et al., U.S. Appl. No. 12/982,100 Now U.S. Pat. No. 8,578,109, filed Dec. 30, 2010, Systems and Methods for Retaining and Using Data Block Signatures in Data Protection Operations.

Vijayan, et al., U.S. Appl. No. 14/040,247 Now U.S. Pat. No. 14/040,247, filed Sep. 27, 2013, Systems and Methods for Retaining and Using Data Block Signatures in Data Protection Operations.

Vijayan, et al., U.S. Appl. No. 14/967,097 Published as 2016/0196070 Abandoned, filed Dec. 11, 2015, Systems and Methods for Retaining and Using Data Block Signatures in Data Protection Operations.

Vijayan, et al., U.S. Appl. No. 15/074,109 Now U.S. Pat. No. 9,639,289, filed Mar. 18, 2016, Systems and Methods for Retaining and Using Data Block Signatures in Data Protection Operations.

Vijayan, et al., U.S. Appl. No. 15/472,737 Published as 2017/0199699, filed Mar. 29, 2017, Systems and Methods for Retaining and Using Data Block Signatures in Data Protection Operations.

Vijayan, et al., U.S. Appl. No. 12/982,087 Now U.S. Pat. No. 8,572,340, filed Dec. 30, 2010, Systems and Methods for Retaining and Using Data Block Signatures in Data Protection Operations.

Muller, et al., U.S. Appl. No. 13/916,409 Now U.S. Pat. No. 9,218,374, filed Jun. 12, 2013, Collaborative Restore in a Networked Storage System.

Muller, et al., U.S. Appl. No. 14/956,185 Abandoned, filed Dec. 1, 2015, Collaborative Restore in a Networked Storage System.

Muller, et al., U.S. Appl. No. 15/067,766 Published as 2016/0266980, filed Mar. 11, 2016, Collaborative Restore in a Networked Storage System.

Muller, et al., U.S. Appl. No. 13/916,429 Published as 2013/0339310 Abandoned, filed Jun. 12, 2013, Restore Using a Client Side Signature Repository in a Networked Storage System.

Muller, et al., U.S. Appl. No. 13/916,385 Published as 2013/0339298 Abandoned, filed Jun. 12, 2013, Collaborative Backup in a Networked Storage System.

Muller, et al., U.S. Appl. No. 13/916,434 Now U.S. Pat. No. 9,251,186, filed Jun. 12, 2013, Backup Using a Client-Side Signature Repository in a Networked Storage System.

Muller, et al., U.S. Appl. No. 13/916,458 Now U.S. Pat. No. 9,218,375, filed Jun. 12, 2013, Dedicated Client-Side Signature Generator in a Networked Storage System.

Muller, et al., U.S. Appl. No. 14/956,213 Published as 2016/0188416 Abandoned, filed Dec. 1, 2015, Dedicated Client-Side Signature Generator in a Networked Storage System.

Muller, et al., U.S. Appl. No. 15/067,714 Now U.S. Pat. No. 9,858,156, filed Mar. 11, 2016, Dedicated Client-Side Signature Generator in a Networked Storage System.

Muller, et al., U.S. Appl. No. 15/820,152, filed Nov. 21, 2017, Dedicated Client-Side Signature Generator in a Networked Storage System.

Muller, et al., U.S. Appl. No. 13/916,467 Now U.S. Pat. No. 9,218,376, filed Jun. 12, 2013, Intelligent Data Sourcing in a Networked Storage System.

Vijayan, et al., U.S. Appl. No. 14/152,509 Now U.S. Pat. No. 9,633,033, filed Jan. 10, 2014, High Availability Distributed Deduplicated Storage System.

Vijayan, et al., U.S. Appl. No. 15/474,730 Published as 2017/0206219, filed Mar. 30, 2017, High Availability Distributed Deduplicated Storage System.

Attarde, et al., U.S. Appl. No. 14/216,703 Now U.S. Pat. No. 9,633,056, filed Mar. 17, 2014, Maintaining a Deduplication Database.

Attarde, et al., U.S. Appl. No. 14/216,689 Published as 2015/0261776, filed Mar. 17, 2014, Managing Deletions From a Deduplication Database.

Vijayan, et al., U.S. Appl. No. 14/152,549 Now U.S. Pat. No. 9,665,591, filed Jan. 10, 2014, High Availability Distributed Deduplicated Storage System.

Mitkar, et al., U.S. Appl. No. 14/527,678 Now U.S. Pat. No. 9,575,673, filed Oct. 29, 2014, Accessing a File System Using Tiered Deduplication.

Mitkar, et al., U.S. Appl. No. 15/399,597 Now U.S. Pat. No. 9,934,238, filed Jan. 5, 2017, Accessing a File System Using Tiered Deduplication.

Mitkar, et al., U.S. Appl. No. 15/899,699, filed Feb. 20, 2018, Accessing a File System Using Tiered Deduplication.

Ngo, et al., U.S. Appl. No. 12/499,717 Now U.S. Pat. No. 8,930,306, filed Jul. 8, 2009, Synchronized Data Duplication.

Ngo, et al., U.S. Appl. No. 14/555,322 Published as 2015/0154220 Abandoned, filed Nov. 26, 2014, Synchronized Data Duplication.

Ngo, et al., U.S. Appl. No. 15/684,812 Published as 2018/0075055, filed Aug. 23, 2017, Synchronized Data Duplication.

Vijayan, et al., U.S. Appl. No. 14/721,971 Published as 2016/0350391, filed May 26, 2015, Replication Using Deduplicated Secondary Copy Data.

Vijayan, et al., U.S. Appl. No. 15/282,445 Published as 2017/0083563, filed Sep. 30, 2016, Replication Using Deduplicated Secondary Copy Data.

Vijayan, et al., U.S. Appl. No. 15/282,553 Published as 2017/0083558, filed Sep. 30, 2016, Replication Using Deduplicated Secondary Copy Data.

Vijayan, et al., U.S. Appl. No. 15/282,668 Published as 2017/0090773, filed Sep. 30, 2016, Replication Using Deduplicated Secondary Copy Data.

Vijayan, et al., U.S. Appl. No. 14/682,988 Published as 2016/0299818, filed Apr. 9, 2015, Highly Reusable Deduplication Database After Disaster Recovery.

Vijayan, et al., U.S. Appl. No. 15/197,434 Published as 2016/0306707, filed Jun. 29, 2016, Highly Reusable Deduplication Database After Disaster Recovery.

Vijayan, et al., U.S. Appl. No. 15/197,435 Published as 2016/0306818, filed Jun. 29, 2016, Highly Reusable Deduplication Database After Disaster Recovery.

Vijayan, et al., U.S. Appl. No. 15/299,299 Published as 2017/0193003, filed Oct. 20, 2016, Redundant and Robust Distributed Deduplication Data Storage System.

Vijayan, et al., U.S. Appl. No. 15/299,254 Published as 2017/0192866, filed Oct. 20, 2016, System for Redirecting Requests After a Secondary Storage Computing Device Failure.

Vijayan, et al., U.S. Appl. No. 15/299,290 Published as 2017/0192860, filed Oct. 20, 2016, Deduplication Replication in a Distributed Deduplication Data Storage System.

Vijayan, et al., U.S. Appl. No. 15/299,280 Published as 2017/0192867, filed Oct. 20, 2016, Rebuilding Deduplication Data in a Distributed Deduplication Data Storage System.

Vijayan, et al., U.S. Appl. No. 15/299,298 Published as 2017/0192861, filed Oct. 20, 2016, Distributed File System in a Distributed Deduplication Data Storage System.

Vijayan, et al., U.S. Appl. No. 15/299,281 Published as 2017/0192868, filed Oct. 20, 2016, User Interface for Identifying a Location of a Failed Secondary Storage Device.

* cited by examiner

DISTRIBUTED DEDUPLICATED STORAGE SYSTEM

INCORPORATION BY REFERENCE TO ANY PRIORITY APPLICATIONS

Any and all applications for which a foreign or domestic priority claim is identified in the Application Data Sheet, or any correction thereto, are hereby incorporated by reference into this application under 37 CFR 1.57.

BACKGROUND

Computers have become an integral part of business operations such that many banks, insurance companies, brokerage firms, financial service providers, and a variety of other businesses rely on computer networks to store, manipulate, and display information that is constantly subject to change. Oftentimes, the success or failure of an important transaction may turn on the availability of information that is both accurate and current. Accordingly, businesses worldwide recognize the commercial value of their data and seek reliable, cost-effective ways to protect the information stored on their computer networks.

In corporate environments, protecting information is generally part of a routine process that is performed for many computer systems within an organization. For example, a company might back up critical computing systems related to e-commerce such as databases, file servers, web servers, and so on as part of a daily, weekly, or monthly maintenance schedule. The company may also protect computing systems used by each of its employees, such as those used by an accounting department, marketing department, engineering department, and so forth.

As such, enterprises are generating ever increasing volumes of data and corresponding storage requirements. Moreover, enterprise storage systems are typically distributed over one or more networks, such as where backup storage is remote from client computers. In such situations, backup storage operations place heavy demands on available network bandwidth.

SUMMARY

In response to these challenges, one technique developed by storage system providers is data deduplication. Deduplication typically involves eliminating or reducing the amount of redundant data stored and communicated within a storage system, improving storage utilization. For example, data can be divided into units of a chosen granularity (e.g., files or data blocks). As new data enters the system, the data units can be checked to see if they already exist in the storage system. If the data unit already exists, instead of storing and/or communicating a duplicate copy, the storage system stores and/or communicates a reference to the existing data segment.

Thus, deduplication can improve storage utilization, system traffic (e.g., over a networked storage system), or both. Deduplication techniques designed to reduce the demands on storage systems during storage operations such as backup and/or replication operations can be found in the following U.S. patent applications, each of which is incorporated by reference in its entirety. One or more embodiments of the present disclosure may be used with systems and methods disclosed therein:

U.S. patent application Ser. No. 12/982,086, entitled "Content Aligned Block-Based Deduplication," filed Dec. 30, 2010;

U.S. patent application Ser. No. 12/982,100, entitled "Systems and Methods for Retaining and Using Block Signatures in Data Protection Operations," filed Dec. 30, 2010

U.S. patent application Ser. No. 13/324,817, entitled "Client-Side Repository in a Networked, Deduplicated Storage System" filed Dec. 13, 2011;

U.S. patent application Ser. No. 12/145,347, entitled "Application-Aware and Remote Single Instance Data Management," filed Jun. 24, 2008;

U.S. patent application Ser. No. 12/145,342, entitled "Application-Aware and Remote Single Instance Data Management," filed Jun. 24, 2008; and U.S. patent application Ser. No. 12/725,288, entitled "Extensible Data Deduplication System and Method," filed Mar. 16, 2010.

In addition, one or more embodiments of the present disclosure may also be used with systems and methods disclosed in the following patents, each of which is hereby incorporated herein by reference in its entirety:

U.S. Pat. No. 7,389,311, entitled "Hierarchical Backup and Retrieval System," issued Jun. 17, 2008;

U.S. Pat. No. 6,418,478, entitled "Pipelined High Speed Data Transfer Mechanism," issued Jul. 9, 2002;

U.S. Pat. No. 7,035,880, entitled "Modular Backup and Retrieval System Used in Conjunction with a Storage Area Network," issued Apr. 25, 2006;

U.S. Pat. No. 6,542,972, entitled "Logical View and Access to Physical Storage in Modular Data and Storage Management System," issued Apr. 1, 2003;

U.S. Pat. No. 6,658,436, entitled "Logical View and Access to Data Manage by a Modular Data and Storage Management System," issued Dec. 2, 2003;

U.S. Pat. No. 7,130,970, entitled "Dynamic Storage Device Pooling in a Computer System," issued Oct. 10, 2006;

U.S. Pat. No. 7,246,207, entitled "System and Method for Dynamically Performing Storage Operations in a Computer Network," issued Jul. 17, 2007;

U.S. Pat. No. 7,454,569, entitled "Hierarchical System and Method for Performing Storage Operations in a Computer Network," issued Nov. 18, 2008;

U.S. Pat. No. 7,613,748, entitled "System and Method for Containerized Data Storage and Tracking," issued Nov. 3, 2009; and U.S. Pat. No. 7,620,710, entitled "Systems and Methods for Performing Multi-Path Storage Operations," issued Nov. 17, 2009.

In those systems employing deduplication, as the amount of data increases, the amount of computational and storage overhead involved in managing the deduplication process can become quite significant. For example, as the amount of data increases, there is a corresponding increase in the number of deduplication data blocks (or other deduplication data units) to maintain. Moreover, such systems often calculate and store signatures (e.g., hashes of the data blocks) associated with each data block which are used to identify and remove redundant data blocks, presenting further capacity and maintenance challenges.

In order to address such challenges, a deduplicated storage system is provided according to certain embodiments that distributes deduplicated data across multiple, networked deduplication nodes. As will be described in greater detail, the deduplication nodes can communicate with one another using a light-weight, customized communication scheme. Using multiple, distributed deduplication nodes will generally be referred to as "parallel deduplication" throughout the disclosure. And, in some cases, deduplication management information is stored separately from the deduplicated data, in separate, special purpose networked storage nodes, for example. Management information can include, without limitation, data block signatures and associated metadata, and mappings of deduplicated files including pointers to data blocks making up the respective files and/or data block location information. The management information can also be distributed across multiple management nodes in a manner similar to the deduplicated data. The distributed nature of the deduplicated data and/or management information enhances scalability, among providing other benefits.

Importantly, because the data blocks are stored and managed separately from the deduplication management information, system designers can tailor the system components according to their specialized purposes. For example, management information generally requires relatively less storage capacity than the data blocks, but is accessed relatively more frequently, for lookup purposes and the like. Thus, the management information can be stored in components having relatively faster access speeds and/or relatively less storage capacity than the storage used to store the data blocks. On the other hand, because the data blocks generally require more storage capacity and are accessed with relatively low frequency, they can be maintained in storage having relatively higher capacity and/or lower access speeds than the storage used to store the management information.

Additionally, because the management and data functionality in parallel deduplication systems are separated from one another, such systems are generally modular, and readily adaptable to increased data requirements than typical systems.

Moreover, the data blocks and management information in parallel deduplication systems described herein can be distributed amongst multiple, networked components. For example, multiple networked computers (deduplication nodes) each having associated storage can be used in such systems to increase storage capacity. Thus, data blocks making up a single file (or other data unit) may be distributed across multiple deduplication nodes. This can present further challenges, however, as the networked deduplication nodes are then called on to efficiently communicate across the network with one another in carrying out data storage operations. As one example, such communication may be employed to restore a requested file comprised of data blocks that are spread across multiple deduplication nodes.

In order to facilitate such communication, one approach is to mount a networked file system across the deduplication nodes. For example, a shared static mount path may be shared across multiple deduplication nodes via network sharing using a sharing protocol such as Network File System protocol (NFS), Common Internet File System Protocol (CIFS), Universal Naming Convention Shares (UNC Shares), and the like. Such an approach can provide the advantage that data stored on remote deduplication nodes is accessible to a requesting node generally as if it were locally stored. However, there can be significant overhead in maintaining operating system (OS) specific information, file structure information, username and password information, etc., associated with such techniques.

In accordance with certain aspects of the disclosure, another technique developed to address these challenges includes utilizing an ad-hoc communication scheme for communication between deduplication nodes, without mounting a networked file system, for example. Using such a scheme, one deduplication node can retrieve a requested data block from another deduplication node storing the requested data block without using network shares, for example. In this manner, the overhead associated with maintaining a mounted networked file system is avoided, and the burden on the system administrator is greatly reduced.

In certain embodiments, the ad-hoc communication scheme utilizes a client-server based protocol such as file transfer protocol (FTP), although other types of communication protocols can be used, such as hyper-text transfer protocol (HTTP), for example. For example, a suite of customized service routines built on such protocols can be provided for performing data access operations between the deduplication nodes. Such techniques can advantageously provide a light-weight, low maintenance networked file system tailored for deduplication purposes.

In certain embodiments, a method of performing a storage operation in a distributed deduplicated storage system is provided. The method includes receiving a request for a file comprised of a plurality of data blocks, the request received at a first data deduplication node of a plurality of data deduplication nodes in communication with one another via a network, data blocks corresponding to a plurality of deduplicated files distributed across the data deduplication nodes. The method can further include, using one or more processors and in response to the request, for each of the plurality of data blocks in the received file, accessing the data block from the first data deduplication node if a copy of the data block already exists at the first data deduplication node. If the data block does not already exist at the first data deduplication node, the method can further include requesting the data block from another data deduplication node storing a copy of the data block. The requesting may be performed using a data block server executing on the first data deduplication node.

In certain embodiments, a distributed deduplicated storage system is provided, including a plurality of data deduplication nodes in communication with one another via a network, data blocks corresponding to a plurality of deduplicated files distributed across the data deduplication nodes. The system may further include a storage manager module executing in one or more processors and configured to receive a request for a file comprised of a plurality of data blocks, the request received at a first data deduplication node of the plurality of deduplication nodes. The storage manager module may further be configured to, in response to the request and for each of the plurality of data blocks in the received file, access the data block from the first data deduplication node if a copy of the data block already exists at the first data deduplication node. If the data block does not already exist at the first data deduplication node, the storage manager module may request the data block from another data deduplication node storing a copy of the data block, the request performed using a data block server executing on the first data deduplication node.

DETAILED DESCRIPTION

Overview

Figure 1:
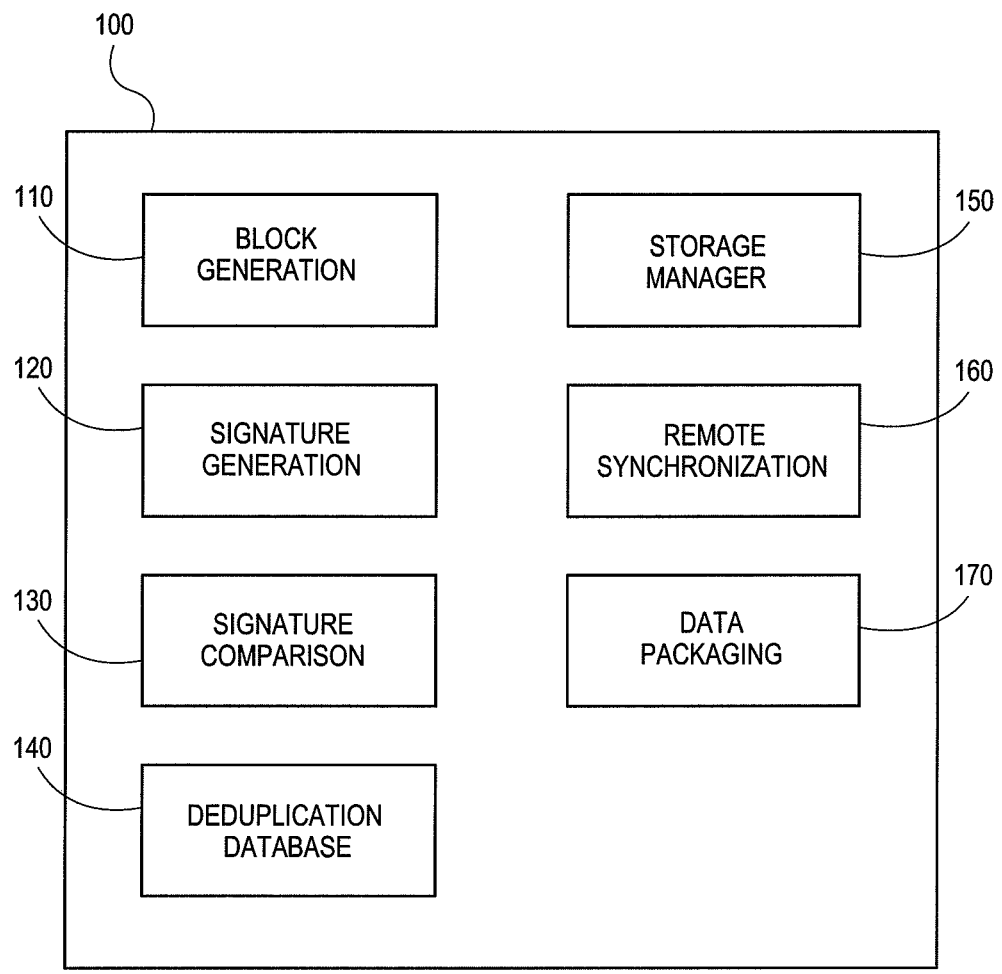
FIG. 1 is a block diagram that illustrates components of an example storage system configured to implement deduplication techniques compatible with embodiments of the invention.

Generally described, the present disclosure is directed to a system, method, and computer-readable non-transitory storage medium for storing data to and restoring data from a storage system including a deduplication database. Although various aspects of the disclosure will be described with regard to examples and embodiments, one skilled in the art will appreciate that the disclosed embodiments and examples should not be construed as limiting.

In accordance with aspects described herein, data is broken up into data blocks, or data segments for processing. For example, the data blocks can be used for the purposes of removing duplicate data blocks and replacing them with references to the data blocks during data deduplication. Thus, a data block refers to a portion of data. The data blocks can vary in size based on system preferences. While other compatible data reduction techniques are possible, the embodiments described herein are described primarily in relation to data deduplication for clarity. Moreover, certain aspects described herein are compatible with systems that do not incorporate data reduction techniques.

In order to identify data blocks, various functions can be performed on individual data blocks to generate a unique or substantially unique signature corresponding to the data block. For example, signature functions, such as hash functions, and the like can be used, as described in greater detail in the applications incorporated by reference herein, such as, for example, the application entitled "Content-Aligned Block-Based Deduplication." Any number of different hash functions or other functions can be performed on the data blocks, such as SHA-512, for example. The hash, or signatures, can be used for a variety of purposes. For example, the signature can be used to determine if two data blocks contain the same data for the purposes of deduplication. In this way, the signature can be used to efficiently determine whether a data block exists in the storage system. Furthermore, the signature can be calculated using any of the components described below including, but not limited to, a client, a storage manager, a data media agent, a deduplication database media agent (DDBMA), and the like.

As described in further detail below with respect to FIGS. 3-5, the description further describes certain embodiments for storing data from a client to a destination storage system (e.g., for backup or replication), and where the deduplicated storage system is advantageously arranged in a parallel configuration. For example, the data is broken up into data blocks and stored in one or more data media agents (DMA) and/or storage devices. On the other hand, management information such as the signatures of the data blocks and location information related to the data blocks is stored separately in one or more deduplication database media agents (DDBMA). Moreover, as described according to yet other aspects, multiple data media agents are networked together and communicate with one another according using a light-weight, customized communication scheme.

Figure 2:
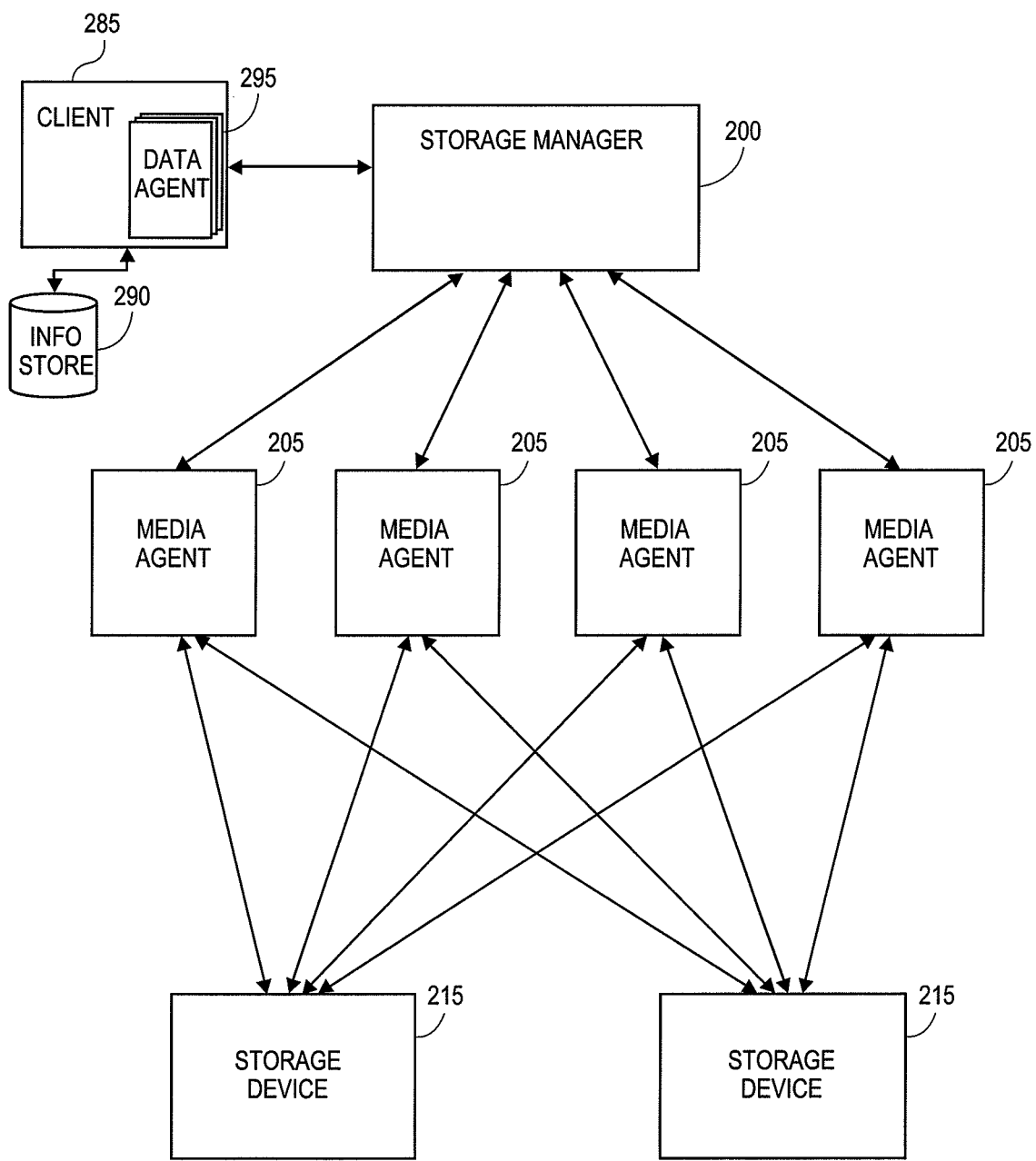
FIG. 2 illustrates a block diagram of an example network storage architecture.

Initially, an overview of a deduplication system and a networked file system compatible with embodiments described herein is provided with respect to FIGS. 1 and 2, respectively.

As used herein, it is to be understood that the term file can refer to multiple files or an entire storage media. Thus, the term file is to be understood as data generally. Illustrative explanations of several terms used throughout the disclosure are provided herein. While these meanings apply to the respective terms as used with respect to certain embodiments, it will be appreciated that the meanings can vary depending on the embodiment. Additionally, the meanings of these and other terms used herein will be understood in view of their usage throughout the entirety of the disclosure.

Deduplication Overview

FIG. 1 is a block diagram that illustrates components of an example storage system 100 configured to implement deduplication techniques compatible with embodiments of the invention. The deduplication system 100 contains a block generation module 110, a signature generation module 120, a signature comparison module 130, a deduplication database (DDB) component 140, a storage manager module 150, a remote synchronization module 160, and a data packaging module 170.

The block generation module 110 generally operates on incoming data to break the data up into blocks which are then processed for deduplication. In various embodiments, the block generation module 110 can create blocks according to a number of policies. In some embodiments, for example, the blocks comprise fixed length segments of data. In other embodiments, blocks have variable lengths. According to certain embodiments, the block generation module 110 aligns the blocks intelligently based on the data content. Such techniques can increase the likelihood that generated blocks will contain duplicate data, thereby improving the amount of data reduction achieved via deduplication. Whether variable or fixed, a variety of block lengths are possible. For example, blocks can be 32 kilobytes (kB), 64 kB, 128 kB, 512 kB, or some other value.

The signature generation module 120 generates a substantially unique signature or identifier of a block. The signature, which is used to determine if another block is already stored at the relevant storage system location matches the block used to generate the signature. The signature comparison module 130 performs comparisons of the generated signatures of previously received and/or stored blocks to determine if they contain the same data (or, in some other embodiments, substantially similar data) as existing blocks. The results of the comparison indicate whether the previously received blocks are candidates for deduplication.

The signature generation module 120 may generate, and the signature comparison module 130 may thus compare, a variety of substantially unique signature types. In one embodiment, for example, the signature is a hash value. In other embodiments, the signature can be a message digest, checksum, digital fingerprint, digital signature or other sequence of bytes that substantially uniquely identifies the relevant data block. The term "substantially" is used to modify the term "unique identifier" because algorithms used to produce hash values may result in collisions, where two different files or data objects result in the same hash value. However, depending upon the algorithm or cryptographic hash function used, collisions should be suitably rare and thus the signature generated for block should be unique throughout the storage system 100.

The deduplication database 140 (DDB) is a data store that contains entries identifying data managed by the deduplication system 100, and may also contain supplemental information associated with files and/or blocks, such as signatures, paths, locations, reference counts, file sizes, or other information.

The storage operation manager module 150 coordinates storage operations and invokes the other modules of the storage system 100 as needed to perform requested storage operations. For example, the storage manager module 150 may include an application used by an administrator to manage the system 100. The storage operation manager module 150 may also maintain indexes of the data objects and each of the references to those data objects through the system 100, as well as pending operations on the data objects that are part of a data management plan of an organization implementing the storage system 100.

The storage system 100 can be a networked storage system configured to perform deduplication at one or more nodes in the system 100, and one or more of the components of the system 100 may be distributed across or instantiated at multiple nodes in the system.

Additionally, the system 100 can reduce the amount of data communicated across the network using deduplication techniques. For example, the synchronization module 160 performs deduplication between locations that are remote from one another, such as between a backup storage system and a secondary backup storage system, between a backup storage system and secondary backup storage, between a client system and a backup storage system, between an enterprise or organization having a headquarters or central office and one or more satellite or remote offices, and the like.

The synchronization module 160 can use the techniques described in further detail herein to determine whether a block should be communicated between the remote locations, or whether only a reference to the block should be communicated instead. As used in this context, the term "remote" can mean the modules are at different locations on the network, are physically or logically removed from one another, etc.

The data packaging module 170 can be generally configured to format data in the storage system 100 in an intelligent manner. For example, the data packaging module 170 according to certain embodiments generally associates and writes signature values along with the corresponding data blocks and/or block references. As is described in greater detail herein, associating and storing the signatures and/or references along with the data blocks can improve system performance.

As described in greater detail herein, redundant data may be detected and reduced at several locations throughout the system and/or times throughout the operation of the system. The embodiments provided herein only as examples, and are not intended to be an exhaustive list of the way in which the system can be implemented. In general, the systems and methods described with respect to any FIGS. 2, 3A, and 3B may include or be performed by the modules included in the system 100 of FIG. 1.

Networked Storage System Overview

FIG. 2 illustrates a block diagram of an example network storage architecture compatible with embodiments described herein. For example, in certain embodiments, one or more of the components of the storage system 100 shown in FIG. 1 are implemented on a networked storage system such as the one shown in FIG. 2. The system 200 is configured to perform storage operations on electronic data in a computer network. As shown, the system includes a storage manager 200 and one or more of the following: a client 285, an information store 290, a data agent 295, a media agent 205, an index cache 210, and a storage device 215. In addition, the storage system can also include one or more index caches as part of the media agent 205 and/or the storage manager 200. The index caches can indicate logical associations between components of the system, user preferences, management tasks, and other useful data, as described in greater detail in application Ser. No. 10/818,749, now U.S. Pat. No. 7,246,207, issued Jul. 17, 1007, herein incorporated by reference in its entirety.

As illustrated, the client computer 285 can be communicatively coupled with the information store 290, and/or the storage manager 200. The information store contains data associated with the client 285. Although not illustrated in FIG. 2, the client 285 can also be in direct communication with the media agent 205 and/or the backup storage device 215. For simplicity, and not to be construed as limiting, the components of storage system 100 are illustrated as communicating indirectly via the storage manager 200. However, all components of the storage system 100 can be in direct communication with each other or communicate indirectly via the client 285, the storage manager 200, the media agent 205, or the like.

With further reference to FIG. 1, the client computer 285 (also generally referred to as a client) contains data in the information store 290 that can be backed up in and then restored from the backup storage device 215. In an illustrative embodiment, the client 285 can correspond to a wide variety of computing devices including personal computing devices, laptop computing devices, hand-held computing devices, terminal computing devices, mobile devices, wireless devices, various electronic devices, appliances and the like. In an illustrative embodiment, the client 285 includes necessary hardware and software components for establishing communication with the other components of storage system 100. For example, the client 285 can be equipped with networking equipment and browser software applications that facilitate communication with the rest of the components from storage system 100. Although not illustrated in FIG. 1, each client 285, can also display a user interface. The user interface can include various menus and fields for entering storage and restore options. The user interface can further present the results of any processing performed by the storage manager 200 in an easy to understand format.

A data agent 295 can be a software module that is generally responsible for archiving, migrating, and recovering data of a client computer 285 stored in an information store 290 or other memory location. Each client computer 285 has at least one data agent 295 and the storage system can support many client computers 285. The storage system provides a plurality of data agents 295 each of which is intended to backup, migrate, and recover data associated with a different application. For example, different individual data agents 295 may be designed to handle Microsoft Exchange™ data, Microsoft Windows file system data, and other types of data known in the art. If a client computer 285 has two or more types of data, one data agent 295 may be implemented for each data type to archive, migrate, and restore the client computer 285 data.

The storage manager 200 is generally a software module or application that coordinates and controls the system. The storage manager 200 communicates with all elements of the storage system 100 including the client computers 102, data agents 295, the media agents 205, and the backup storage devices 215, to initiate and manage system backups, migrations, recoveries, and the like. The storage manager 200 can be located within the client 285, the media agent 205, or can be a software module within a separate computing device. In other words, the media agent 205 and/or the client 285 can include a storage manager module. In one embodiment, the storage manager 200 is located in close proximity to the client 285 and communicates with the client 285 via a LAN. In another embodiment, the storage manager 200 communicates with the client 285 via a WAN. Similarly, in one embodiment, the storage manager 200 communicates with the media agent 205 via a LAN, and in another embodiment communicates with the media agent 205 via a WAN.

The storage manager 200 can also deduplicate the data that is being backed up in storage device 215. For example, the storage manager 200 can analyze individual data blocks being backed up, and replace duplicate data blocks with pointers to other data blocks already stored in the backup storage device 215. To identify duplicate data blocks, the storage manager 200 can perform hash functions, on each data block. The hash functions of the different data blocks can be compared. Matching hashes of different data blocks can indicate duplicate data, which can be replaced with a pointer to previously stored data. Additional detail regarding deduplicating data is provided in the applications incorporated by reference herein. Other components of storage system 100 can perform the deduplication techniques on the data blocks, such as the media agent 205, the client 285, and/or the storage device 215.

A media agent 205 is generally a software module that conducts data, as directed by the storage manager 200, between locations in the storage system 100. For example, the media agent 205 may conduct data between the client computer 285 and one or more backup storage devices 215, between two or more backup storage devices 215, etc. Although not shown in FIG. 1, one or more of the media agents 205 can also be communicatively coupled to one another. In some embodiments, the media agent communicates with the storage manager 200 via a LAN or SAN. In other embodiments, the media agent 205 communicates with the storage manager 200 via a WAN. The media agent 205 generally communicates with the backup storage devices 215 via a local bus. In some embodiments, the backup storage device 215 is communicatively coupled to the media agent(s) 112 via a Storage Area Network ("SAN").

The backup storage devices 215 can include a tape library, a magnetic media backup storage device, an optical media backup storage device, or other backup storage device. The backup storage devices 215 can further store the data according to a deduplication schema as discussed above. The storage devices 215 can also include a signature block corresponding to each stored data block.

Further embodiments of storage systems such as the one shown in FIG. 2 are described in application Ser. No. 10/818,749, now U.S. Pat. No. 7,246,207, issued Jul. 17, 2007, which is hereby incorporated by reference in its entirety. In various embodiments, components of the storage system may be distributed amongst multiple computers, or one or more of the components may reside and execute on the same computer.

Furthermore, components of the storage system of FIG. 2 can also communicate with each other via a computer network. For example, the network may comprise a public network such as the Internet, virtual private network (VPN), token ring or TCP/IP based network, wide area network (WAN), local area network (LAN), an intranet network, point-to-point link, a wireless network, cellular network, wireless data transmission system, two-way cable system, interactive kiosk network, satellite network, broadband network, baseband network, combinations of the same or the like.

Additionally, the various components of FIG. 2 may be configured for deduplication. For example, one or more of the clients 285 can include a deduplicated database (DDB). The data stored in the storage devices 215 may also be deduplicated. For example, one or more of the media agents 205 associated with the respective storage devices 215 can manage the deduplication of data in the storage devices 215.

Example Parallel Deduplicated Storage System

Figure 3A:
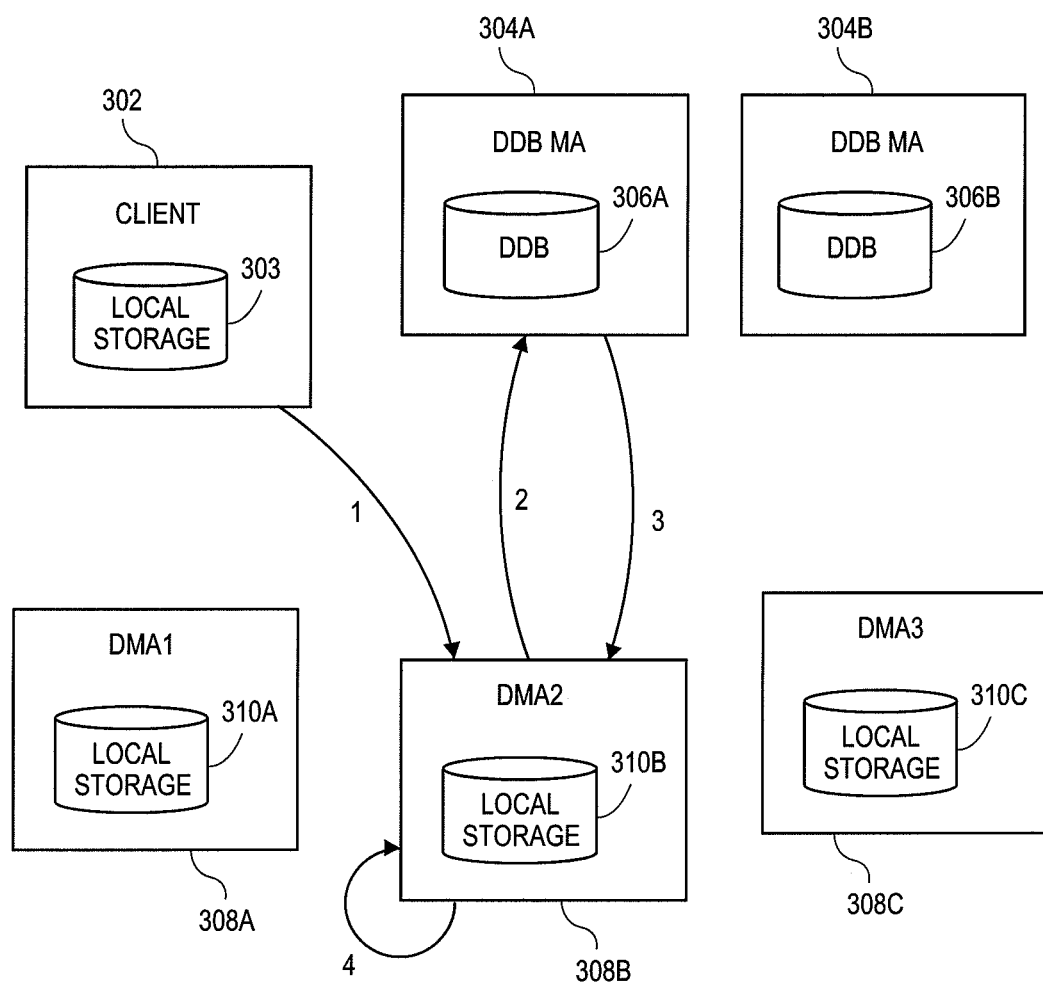
FIGS. 3A-3B are data flow diagrams illustrative of the interaction between the various components of an example parallel deduplicated storage system with respect to example backup and restore operations, respectively.
Figure 3B:
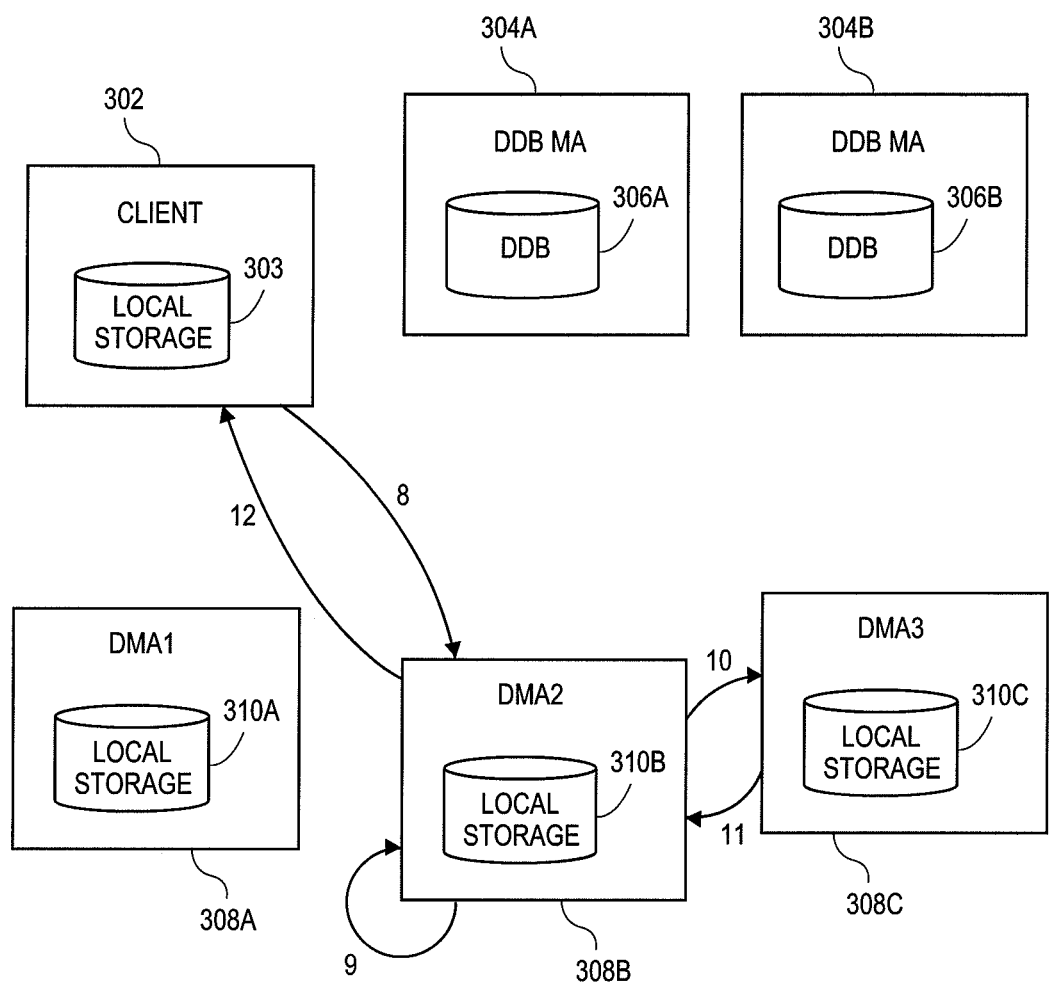

FIGS. 3A-3B are data flow diagrams illustrative of the interaction between the various components of an example parallel storage system with respect to example backup and restore operations, respectively. While described with respect to backup for the purposes of illustration, the techniques described herein are compatible with other types of storage operations, such as, for example, replication, snapshots, archiving and the like. A description of some storage operations compatible with embodiments described herein is provided near the end of this disclosure.

As illustrated, the example storage environment includes a client 302 with a local storage device 303, deduplication database media agents 304A, 304B (one or both may be referred to generically as "DDBMA 304"), deduplication databases 306A, 306B each associated with one of the DDBMAs (one or both may be referred to generically as "DDB 306"), and data media agents 310A-310C (one or more may be referred to generically as "DMA 308") each with its own local storage device(s) 310A-310C (one or more may be referred to generically as "local storage 310"), respectively. Client 302 can be similar to client 285 and local storage 303 can be similar to information store 290, both of which are described in greater detail above with reference to FIG. 2. While a single client 302 is shown for the purpose of illustration, there may be more than one client in other embodiments. Similarly, there can be other numbers of DDBMAs (e.g., one, three or more) and DMAs (e.g., one, four or more). Additionally, in certain other embodiments, some of the components shown in FIGS. 3A-3B shown as separate components can reside on a single computing device. In one embodiment, for example, the functionality of the DDBMA 306A and the DMA 308A are implemented on a first computing device, and the functionality of the DDBMA 306B and the DMA 306B are implemented on another computing device.

Each component of the backup storage environment can be in direct communication with one or more of the other components or, alternatively, can communicate indirectly with one or more of the other components (e.g., via the client 302, the DDBMA 304, or DMA 308). Alternatively, the various components can communicate via a storage manager, which is not illustrated.

The deduplicated data blocks (or other units) of the illustrated example are stored separately from the deduplication management information according to the parallel deduplication architecture, providing a number of advantages, such as those touched on above. The DDBMAs 304 store deduplication management information such as data block signatures (e.g., hashes) and storage location information for the data blocks stored in the backup storage system, which is also referred to throughout the disclosure as a link. The DMA 308, on the other hand, store the data blocks themselves.

Generally, deduplication management information can include any appropriate information used to manage the deduplication process. As an example, in addition to deduplication signatures, the management information can further include metadata related to the deduplicated blocks. For instance, a count value may be maintained for each deduplicated block that indicates the number of times the particular block is being used. As one example, if two files each include three instances of a particular block, and a third file includes one instance of the block, the count for that block would be seven. The management information can further include addresses or other location information related to the data blocks. As yet another example, the management information can include mappings of the individual deduplicated files including pointers to the data blocks making up the files and an indication as to the ordering of the data blocks.

As described above, the signature is generated using a hash function or some other function, and is used by the backup storage system to determine whether the data block already exists in the storage system, the location of data blocks within the backup storage system, and the like. As described, associated with each signature is location information, which is used by the backup storage system to locate and retrieve specific data blocks. In one embodiment, the link includes a media agent ID indicating which DMA 308 the data block is stored on, and a path ID, address and offset indicating where the data block stored on the particular DMA 308. The location information or link can generally include various types of DMA identifiers, directory names, filenames, address locations, pointers, offsets, and the like, which can aid the backup storage system in locating individual data blocks. The DMA identifiers can include a MAC addresses, IP addresses, router information, directory information, filenames and/or other alphanumeric identifiers capable of uniquely identifying the different DMA 308. Thus, the DDBMA 304 stores signatures and links to data blocks stored within the backup storage system. The links can include, without limitation, a signature associated with the block and identifiers indicative of the location of the data block. The locational identifiers can include positional information such as the relevant host, mount point, file identifier, offset and size of the block, etc.

As will be described in greater detail below, the DMA 308 use the links during storage operations to reference data blocks already stored in the backup storage system (i.e. redundant data blocks). The DMA 308 also use the links during restore operations to locate and retrieve data blocks stored in the backup storage system.

In the illustrated embodiment, the DMA 308 store files received from the client as a plurality of individual data blocks, such as when a file is transmitted to the DMA 308 for backup purposes. According to the parallel deduplication architecture, the data blocks associated with a specific file may be distributed across multiple DMAs 308.

As mentioned previously, the backup storage system can use various storage policies to determine which DMAs 308 store which data block. In one embodiment, the storage manager (not shown) selects a DMA 308 for backing up a particular file (or block(s) in a file) based on a predetermined storage policy, and sends the file to the selected DMA 308 for backup. For instance, the system may perform a modulo or other appropriate operation on the signature (e.g., hash) of the file (or block(s) in the file) and select the appropriate DMA based on the output of the operation.

Similarly, the storage system can use similar storage policies to identify a DMA 308 storing a file for the purposes of a restore operation. In one embodiment, the storage manager or other appropriate entity keeps track of which DMA 308 the file was written to during backup, and sends the restore request to that DMA 308.

With further reference to FIG. 3A, the interaction between the various components of the storage environment during a storage operation will now be described in greater detail with respect to data flow steps indicated by the numbered arrows.

The client 302 initiates a backup of a file stored in the local storage device 303 at data flow step 1. In the example, the DMA2 308B is selected as the backup location. For example, the DMA2 may be selected by a storage manager module (not shown) according to a particular predetermined policy. The file is broken up into data blocks, and the DMA2 performs a signature function on each data block.

In the example, each data block is sent to the DMA2 308B for storage, based on the predefined storage policy. Alternatively, only the signature is initially sent to the DMA2 308B. If it is determined that the data block is not stored in the backup storage system, the data block is sent as well.

Before storing a copy of each data block, the DMA2 308B first determines whether the data block is redundant and thus already stored in one of the DMAs 308 by consulting one of the DDBMAs 304. When a data block is stored in the storage system, the DDBMA 304 in which the link information is stored is selected according to a predetermined policy. Having knowledge of this policy, the DMA 308 can advantageously identify the appropriate DDBMA 304 to consult as to the presence of the data block, without having to unnecessarily consult any of the other DDBMA 304. In the example, the storage policy dictates that a modulo of the data block hash to select the appropriate DDBMA 304. Thus, the DMA2 308B performs a modulo operation on the hash of the data block and, based on the output of the modulo operation, selects the appropriate DDBMA 304 to consult. In the illustrated example there are two DDBMA, so the output of the modulo is in the set {0, 1}. As indicated by data flow step 2, the output of the modulo directs the DMA2 308B to send the hash or other signature value to the DDBMA 306A. The DMA2 308B sends the signature of the data block to the DDBMA 304A. The DDBMA 304A compares the received signature with the signatures stored in the DDB 306A, and responds accordingly.

Alternatively, prior to sending the signature to the DDBMA 304A, the DMA2 308B checks a local signature repository, which includes the signatures of all the hashes stored in the local storage 310B, to determine if the data block is already stored locally.

A variety of other implementations are possible for determining which DDBMA to query regarding a data block. In another embodiment, the system includes ten DDBMA and uses modulo ten on the hash of the data block to determine which DDBMA to query regarding the data block. The outcome of the modulo operation will be {0, 1, 2, 3, 4, 5, 6, 7, 8, 9}. Assuming the outcome of the modulo operation is 7, DDBMA 7 is queried. The modulo 10 of a subsequent hash may be 0, in which case DDBMA 0 is queried. Other functions other than a modulo may be used. Moreover, the backup storage system can divide the data blocks based on a modulo of the data block itself, based on frequency of use of the data blocks, pseudo-randomly, file type, client source, etc.

As indicated by data flow step 3, if the DDBMA 304A finds the signature in the DDB 306A, the DDBMA 304A responds to the DMA2 308B with a link indicating the location of the data block, which may be in the DMA2 308B itself, or another DMA 308A, 308C. Upon receiving the link, the DMA2 308B stores the link or other metadata representative to the data block in local storage 310B instead of storing the redundant data block itself, as indicated by data flow step 4.

Also as indicated by data flow step 3, in the event that the DDBMA 304A does not find the signature, the DDBMA 304A responds to the DMA2 308B indicating that the data block is not stored in the backup storage system. In turn, the DMA 306A proceeds to store the data block in the local storage 310B, as indicated by data flow step 4. The DMA2 308B may also send the signature of the data block as well as location information indicating where the data block is stored in the local storage 310B to the DDBMA 304A. Upon receiving the signature and the location information, the DDBMA 304A uses the location information to generate a link for the data block and stores the link and/or signature in DDB 306A for future reference.

Alternatively, once the DDBMA 304A determines that the data block is not stored in the backup storage system, it stores the signature in the DDB 306A before alerting the DMA2 308B that the data block is not stored in the backup storage device. In response, the DMA2 308B stores the data block, as discussed above, and sends the DDBMA 304A the location information. In turn, the DDBMA 304A generates the link and stores the link in the DDB 306A along with the already-stored signature. In addition to the examples provided, it will be appreciated that a variety of other handshaking mechanisms are possible between the DMA 308 and the DDBMA 304.

The remaining data blocks of the file are backed up to the DMA2 308B in a similar fashion, wherein the data blocks themselves are stored for new data blocks and links to redundant data blocks are stored in the local storage 310B, as appropriate.

Although the above-embodiment is described in terms of the client 302 sending files to the DMA2 308B and the DMA2 308B only interacting with the DDB 304A, it is to be understood that the client 302 can use any DMA 308 to store data blocks and that any DMA 308 can interact with any DDBMA 304 in determining where and when to store data blocks. Furthermore, a storage policy can be implemented to determine which files are sent to which DMA 308 for backup and which DDBMA 304 are used to lookup which data block signatures. The storage policy may use a modulo operand as discussed previously, or some other method to determine which DMA 308 to use for data block storage and which DDBMA 304 to use for signature lookups. The storage policy can also include information regarding how files should be retrieved and what DMA 308 to use during restore.

Referring now to FIG. 3B, an example restore operation will now be described. In an embodiment, the client 302 initiates a restore of a file stored in the backup storage system, as indicated by data flow step 8.

The restore request and/or data block is received by DMA2 308B based on a predetermined storage policy. For each data block, DMA2 308B determines if it is stored locally in local storage 310B or in another DMA 308A, 310C. As indicated by data flow step 9, the DMA2 308B retrieves each locally stored data block from local storage 310B, and aggregates it with other data blocks to restore the file to the client 302. Alternatively, the DMA2 308B sends the client each data block as it is retrieved.

Inter-Deduplication Node Communication

Referring still to FIG. 3B and as described earlier, for each data block that is part of the file to restore and not stored in the local storage 310B, the local storage 310B contains a link. The link contains information that allows the DMA2 308B to locate and request the data block from the DMA 308 storing the data block. The DMA2 308B retrieves the link and uses the information to dynamically request the data block from the appropriate DMA 308. In this case, the DMA3 308C contains the data block.

As touched on above, the DMAs 308 can advantageously communicate with one another according to a specialized, light-weight communication scheme. For example, in requesting the data block from the DMA3 308C (data flow step 10), the DMA2 308B uses a client-server protocol to communicate with the DMA3 308C. Moreover, a suite of specialized service routines can be provided to the DMAs 308 which can be utilized for inter-DMA 308 communication on an ad-hoc or as-needed basis. For example, in one embodiment, a suite of custom services built on the file-transfer protocol (FTP) are used. Thus, the DMA2 308B calls an FTP-based read routine or other routine used to request data blocks from another DMA from the suite of provided services. The DMA2 308B may provide as inputs to the routine an identifier for the DMA3 308C and location information derived from the data block link information, such as path and or offset information. In one embodiment, the signature is provided to the read routine.

In response, the DMA3 308C retrieves the data block from the local storage 310C and sends the data block to the DMA2 308B. For example, the DMA3 308C selects an FTP-based write routine or other appropriate routine from the suite of services to send the data block to the DMA2 308B. For example, the DMA3 308C may provide an identifier from the DMA2 308B to the write routine along with the requested data block.

A wide variety of implementations are possible for the light-weight, inter-DMA 308 communication. For example, other types of networking protocols can be used, such as other types of client-server based protocols, including hyper-text transfer protocol (HTTP), secure shell (SSH), and the like, some other internet protocol (IP) or TCP/IP based network protocol, etc. Moreover, the communication scheme can include an entire suite of services including services to write, read, query, or provide other appropriate functions. Generally, the service suite according to certain embodiments includes a number and variety of services sufficient to enable the DMA 308 to serve as a stream-lined, clustered file system. In other embodiments, only one or two types of service routines are provided. Port numbers for inter-DMA communication can be found using a lookup service of the communication service running on the DMAs 308. Headers can also be used to facilitate inter-DMA communication, and can include, without limitation, a hostname of the target DMA, mount path location, chunk identifier, file identifier, block offset, etc. For instance, the DMAs 308 may store headers associated with each of the data blocks. In some embodiments, for instance, the requesting DMAB 308 receives the header from the DDBMA 304A along with or embedded in the link to the requested block. The header can then be used in the communication between the requesting DMA 308B and the target DMA 308C. As one example, the requesting DMA 308B may include some or all of the information in the header in the request for the data block from the target DMA 308C, or may otherwise use information in the header to construct the request. The requesting DMA 308B constructs an FTP-based request or an HTTP-based request, for instance. Moreover, the target DMA 308C may receive some or all of the header information (e.g., the chunk identifier, file identifier and block offset) and use that information to retrieve the requested block.

Other components in the storage system may communicate with one another over similar communication schemes, or may have their own suite of communication services. In one embodiment, for example, the DDBMAs 304 communicate with one another and/or the DMAs 308 in such a manner. In one embodiment, the media DMAs 308 communicate with the DDBMAs using remote procedure call (RPC) over network sockets, although other inter-process communication flows could be used. Inter-DMA communication can be achieved using RPC over sockets in some cases as well.

The DMA2 308B aggregates the received block with any other blocks in preparation of restoring the file to the client 302. Alternatively, the DMA2 308B sends the client each block as it is retrieved, or requests the DMA3 308C to send the client each data block as it is received.

Thus, for each data block, the DMA2 308B dynamically requests the data block from DMA3 308C (or other DMA 308) using a specialized, light-weight service. By dynamically requesting the data block, the DMA2 308B avoids accessing the local storage 310C of the DMA3 308C directly, or through a shared static mount path configuration such as in NFS, CIFS or UNC shares based environment. Thus, inter-DMA communication generally does not involve integration, development or maintenance of the DMA 308 (or other type of deduplication node) at the file-system or operating system (O/S) level. For example, there are no O/S based services involved in inter-DMA 308 communication. Moreover, management overhead associated with other implementations (e.g., NFS, CIFS or UNC shares) is reduced, such as overhead associated with maintaining username & passwords or other authentication information for each of the DMA 308. As such, inter-DMA 308 communication in some such embodiments is achieved in a manner that involves little or no user interaction, from IT administrators or other personnel, for example. In this manner, the file-system structure and O/S of the DMA3 308C is generally irrelevant to DMA2 308B. The DMA2 308B simply requests the data from the DMA3 308C, and the DMA3 308C retrieves the data block from the local storage 310C and sends the local storage to the DMA2 308B for processing. Additionally, because the above-described specialized inter-DMA 308 communication scheme does not rely on a pre-defined networked-file sharing protocol such as NFS or UNC shares, customized authentication protocols can be implemented, improving security. Moreover, additional deduplication nodes can be added or removed in a modular fashion to scale the storage system in a stream-lined fashion, without overly burdensome administrative effort.

Although the above-embodiment is described in terms of the client 302 requesting a restore from the DMA2 308B, and the DMA2 308B only interacting with the DMA3 308C, it is to be understood that the client 302 can use any DMA 308 to restore data blocks and that any DMA 308 can interact with any other DMA 308 in requesting and retrieving data blocks. For example, the DMA 308A can receive the restore request and then request data blocks from the DMA2 308B and the DMA3 308C.

Furthermore, the DDBMA 304 can be used to locate blocks during a restore operation. For example, the link stored in the local storage 310 can include only information regarding which DDBMA 304 contains the location information of the data block. Thus, a DMA 308 can query the DDBMA 304 for the location information and use the location information received from the DDBMA 304 to request the data block. Alternatively, upon receiving the query, the DDBMA 304 can request the data block from the appropriate DMA 308 and have the DMA 308 transmit the data block directly to the requesting DMA 308, to the client 302 or back to the DDBMA 304. In this manner, the DDBMA 304 can be more actively involved in the restore operation. As mentioned previously, a storage manager can also coordinate the restore operation, including the requesting and collection of data blocks, and aggregating the data blocks for the client 302.

Figure 4:
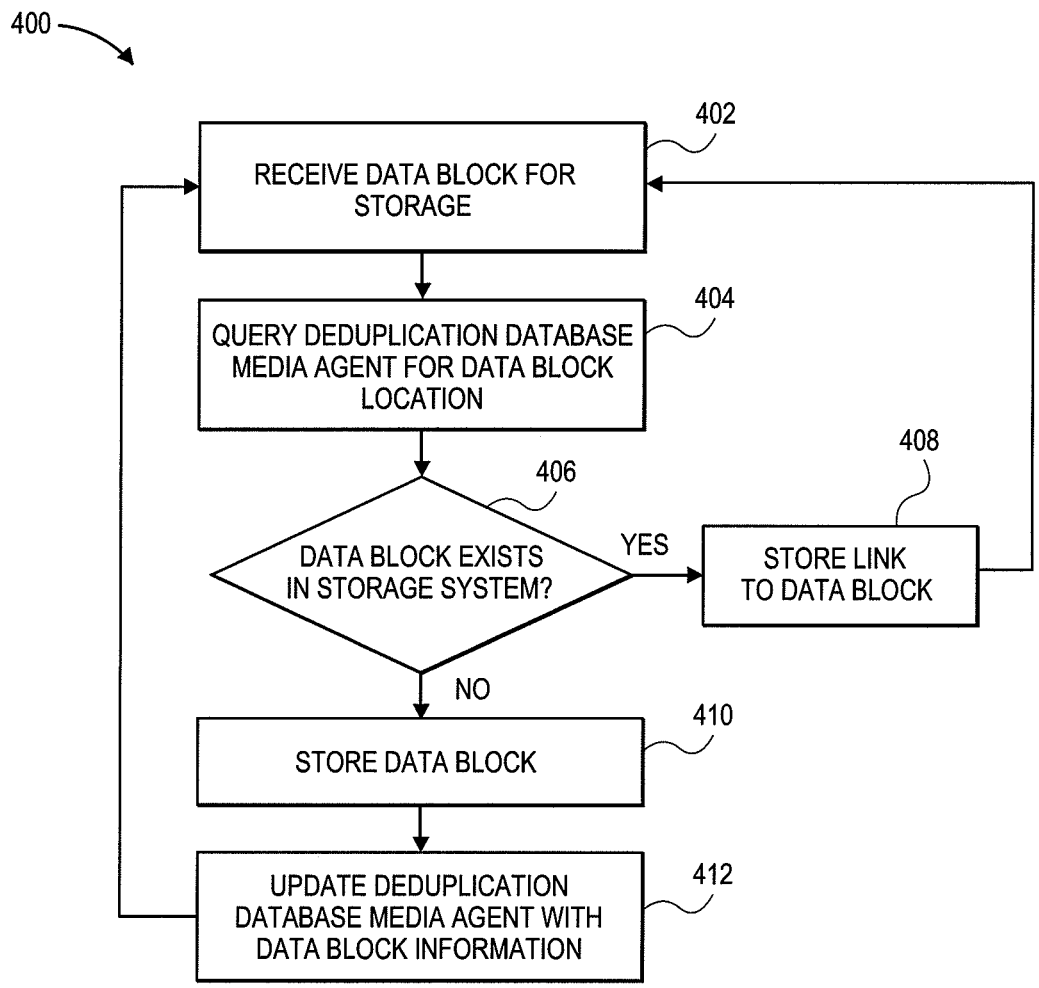
FIG. 4 is a flow diagram illustrative of one embodiment of a routine implemented by a parallel deduplicated storage system for processing a storage request and storing a file to the backup storage system.
Figure 5:
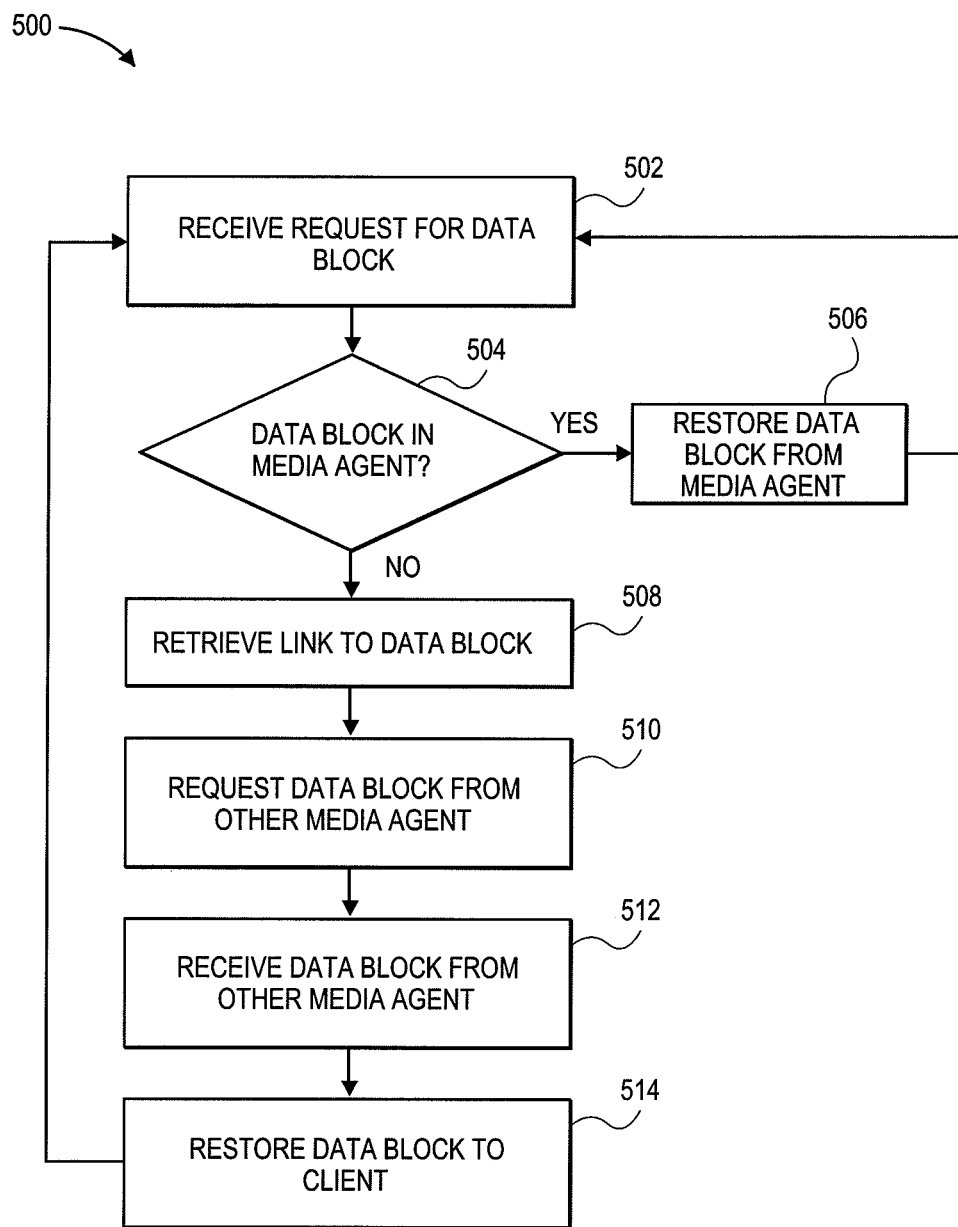
FIG. 5 is a flow diagram illustrative of one embodiment of a routine implemented by a parallel deduplicated storage system for processing a restore request and restoring data to a client.

FIGS. 4 and 5 are flow diagrams illustrative of various processes or routines that the storage system can carry out. FIG. 4 is a flow diagram of a routine implemented by the storage system for processing a store operation and storing data blocks to the backup storage system. FIG. 5 is a flow diagram of a routine implemented by the backup storage system for processing a restore operation and restoring data blocks to a client. Although described in relation to backup operations for the purposes of illustration, the processes described herein including those described with respect to FIGS. 4 and 5 are compatible with other storage operations, such as, for example, replication operations.

FIG. 4 is a flow diagram illustrative of one embodiment of a routine 400 implemented by a backup storage system for processing a storage request and storing a file to the backup storage system. For example, routine 400 can apply to embodiments described in reference to FIGS. 1, 2, 3A and 3B. One skilled in the relevant art will appreciate that the elements outlined for routine 400 may be implemented by one or many computing devices/components that are associated with the backup storage system, described in greater detail above with reference to FIG. 3. For example, routine 400 can be implemented by any one, or a combination, of the client 302, a storage manager, deduplication database media agent (DDBMA) 304 (i.e. any one of the DDBMA 304A-304B), the data media agent (DMA) 308 (i.e. any one of the DMA 308A-308C) and the like. Accordingly, routine 400 has been logically associated as being generally performed by the storage system, and thus the following illustrative embodiments should not be construed as limiting. Furthermore, the functions performed at each block are described in greater detail above with reference to FIG. 3A.

At block 402, the backup storage system receives a data block for storage. The request can be received from the client, a new client, one client on behalf of another, a storage manager, DMA, DDBMA, or the like. Alternatively, the backup storage system can receive a signature of a data block or a file, as described above.

At block 404, the backup storage system queries a deduplication database media agent (DDBMA) for the data block location, as described previously with reference to FIG. 3. The backup storage system then determines if the data block exists in the backup storage system using information found in the DDBMA, as illustrated in block 406. If the backup storage system determines that the data block is already stored in the system, the backup storage system stores a link to the data block, as illustrated in block 408. Upon storing the link, the backup storage system awaits another data block for storage. Upon receiving another data block for storage the routine 400 repeats.

On the other hand, if the backup storage system determines that the data block is not stored in the system, the backup storage system stores the data block, as illustrated in block 410, and updates the DDBMA with the data block information, as illustrated in block 412. The data block information including information regarding how to locate and retrieve the data block.

As noted earlier, the routine 400 can be implemented by any component of the backup storage system, such as a storage manager DDBMA and/or a DMA. The routine 400 can further be implemented by the client. For example a DMA, can receive a data block, query the DDBMA, receive a response from the DDBMA and determine whether or not the data block exists in the backup storage system. Accordingly, the DMA can store a link to the data block or store the data block and send the appropriate information to update the DDBMA. Similarly, a storage manager can receive the data block query the DDBMA and based on the determination, either store the link to the data block in a DMA or store the data block in the DMA and send the appropriation information to update the DDBMA. Thus, many variations exist for implementing routine 400.

One skilled in the art will appreciate that routine 400 can include fewer, more, or different blocks than those illustrated in FIG. 4 without departing from the spirit and scope of the description. For example, prior to querying the DDBMA, the backup storage system can query the local storage of a DMA for the data block. If the data block is not located in the local storage of the DMA, the backup storage system can query the DDBMA. If the data block is found in the local storage of the DMA, the backup storage system can store a link to the data block in the DMA. In addition, the backup storage device can aggregate a number of queries to the DDBMA, and transmit all the queries together as a bundle.

FIG. 5 is a flow diagram illustrative of one embodiment of a routine 500 implemented by a storage system for processing a restore request and restoring data to a client. For example, routine 500 can apply to embodiments described in reference to FIGS. 1, 2, 3A and 3B. One skilled in the relevant art will appreciate that the elements outlined for routine 500 may be implemented by one or many computing devices/components that are associated with the backup storage system, described in greater detail above with reference to FIG. 3. For example, routine 500 can be implemented by any one, or a combination, of the client 302, a storage manager, deduplication database media agent (DDBMA) 304 (i.e. any one of the DDBMA 304A-304B), the data media agent (DMA) 308 (i.e. any one of the DMA 308A-308C) and the like. Accordingly, routine 500 has been logically associated as being generally performed by the backup storage system, and thus the following illustrative embodiments should not be construed as limiting. Furthermore, the functions performed at each block are described in greater detail above with reference to FIG. 3B.

At block 502, the storage system receives a restore request for a data block. As mentioned previously, the backup storage system can also receive a request for a file, and breakup the file into one or more data blocks. The request can be received from or by a client 408, a new client, one client on behalf of another, a storage manager, a DMA, a DDBMA, or the like. The request can occur automatically upon a reboot, local storage error, lost data, predetermined time interval, user selection, addition of a new client, or the like.

At block 504, the backup storage system checks a data media agent (DMA) for the data block. If the data block is found in the DMA, the backup storage system restores the data block to the client, as illustrated in block 506. Alternatively, the backup storage system awaits the retrieval of all the data blocks associated with a request and restores all the data blocks together to the client. Upon restoring the data block to the client, the backup storage device awaits another request to restore a data block, or continues restoring the data blocks already requested.

On the other hand, if the data block is not found in the DMA, the backup storage system retrieves a link to the data block, as illustrated in block 508. As mentioned above, with reference to FIGS. 3A, 3B, and 4, links are stored in the place of redundant data blocks. As mentioned previously, the link includes information that allows the backup storage to locate and retrieve the data block. Specifically, the link provides the backup storage device with the information to request and receive the data block from a specific DMA. Thus, as illustrated in block 510, using the link information, the backup storage device requests the data block from the DMA storing the data block. The DMA storing the data block uses the information received from the backup storage system to locate, retrieve and transmit the data block to the backup storage system. The information received from the backup storage system can include the link information, a signature of the data block, file location information, offset information, an address location, or any other information that allows the DMA storing the data block to locate and retrieve the data block. In some embodiments, a header such as one of the headers described above is used to facilitate inter-DMA communication of the data blocks. For instance, the header can include metadata (e.g., target DMA host name, mount path location, chunk identifier, file identifier, block offset, etc.) that the requesting DMA can embed in or otherwise use to create the request for the block. In one embodiment, the requesting DMA receives the header from the DDBMA 304A along with or embedded in the link. The requesting DMA can then employ the header in the request, e.g., by including some or all of the header information in the request (e.g., an FTP or HTTP-based request). For instance, the DMA host name may be used to properly direct the request to the target DMA. Moreover, the request may pass some or all of the header information (e.g., the chunk identifier, file identifier and block offset) along to the target DMA, which can use that information to retrieve the requested block. Using the header information, link and/or other appropriate information, the target DMA retrieves the requested block and transmits the block to the requesting DMA.

The requesting DMA receives the data block from the target DMA at block 512, and at block 514 the backup storage device restores the data block to the client. Upon restoring the data block to the client, the backup storage device awaits another request to restore a data block, or continues restoring the data blocks already requested. As indicated, the data blocks may be requested and/or retrieved in groups or bundles in certain embodiments.

As noted earlier, the routine 500 can be implemented by any component of the backup storage system, such as a storage manager DDBMA and/or a DMA. The routine 500 can further be implemented by the client. For example a DMA, can receive the restore request, query itself for the data block, and restore the data block if found. If not found the DMA can retrieve the link stored in its local storage, request and receive the data block from the DMA storing the block and restore the data block to the client. Alternatively, a storage manager can receive the restore request and query a DMA for the block. If found the storage manager can restore the data block from the DMA. If not found in the first DMA, the storage manager can use a link from the first DMA to request and receive the data block from a second DMA. The storage manager can then restore the data block. Alternatively, a storage manager can query a DDBMA for each data block. Using the information in the DDBMA, the storage manager can request and receive the data block from the appropriate DMA. The storage manager can then restore the data block. A DDBMA can also be used to locate and restore each data block. Upon receiving the restore request, the DDBMA can check its database for the link information for each data block. The DDBMA can then request the data block from the appropriate DMA and restore it accordingly.

The routine 500 can include fewer, more, or different blocks than those illustrated in FIG. 5 without departing from the spirit and scope of the description. For example, the data block can be aggregated together before being restored to the client, and/or the backup storage system can request the DMA to send the data block to the client directly. Furthermore, link information stored in the DMA can only include information regarding which DDBMA has the location information of the data block. The DDBMA can then be consulted to locate the data block. In addition, the DMA can bundle a number of requests for data and transmit all the requests the DMA storing the data blocks associated with the requests at the same time.

It will be appreciated by those skilled in the art and others that all of the functions described in this disclosure may be embodied in software executed by one or more processors of the disclosed components and mobile communication devices. The software may be persistently stored in any type of non-volatile storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

In certain embodiments of the invention, operations disclosed herein can be used to copy or otherwise retrieve data of one or more applications residing on and/or being executed by a computing device. For instance, the applications may comprise software applications that interact with a user to process data and may include, for example, database applications (e.g., SQL applications), word processors, spreadsheets, financial applications, management applications, e-commerce applications, browsers, combinations of the same or the like. For example, in certain embodiments, the applications may comprise one or more of the following: MICROSOFT EXCHANGE, MICROSOFT SHAREPOINT, MICROSOFT SQL SERVER, ORACLE, MICROSOFT WORD and LOTUS NOTES.

Moreover, in certain embodiments of the invention, data backup systems and methods may be used in a modular storage management system, embodiments of which are described in more detail in U.S. Pat. No. 7,035,880, issued Apr. 5, 2006, and U.S. Pat. No. 6,542,972, issued Jan. 30, 2001, each of which is hereby incorporated herein by reference in its entirety. For example, the disclosed backup systems may be part of one or more storage operation cells that includes combinations of hardware and software components directed to performing storage operations on electronic data. Exemplary storage operation cells usable with embodiments of the invention include CommCells as embodied in the QNet storage management system and the QiNetix storage management system by CommVault Systems, Inc., and as further described in U.S. Pat. No. 7,454,569, issued Nov. 18, 2008, which is hereby incorporated herein by reference in its entirety.

Storage operations compatible with embodiments described herein will now be described. For example, data can be stored in primary storage as a primary copy or in secondary storage as various types of secondary copies including, as a backup copy, a snapshot copy, a hierarchical storage management copy ("HSM"), an archive copy, and other types of copies. Certain embodiments described herein with respect to backup operations are similarly compatible with each of these types of operations.

A primary copy of data is generally a production copy or other "live" version of the data which is used by a software application and is generally in the native format of that application. Such primary copy data is typically intended for short term retention (e.g., several hours or days) before some or all of the data is stored as one or more secondary copies, such as, for example, to prevent loss of data in the event a problem occurred with the data stored in primary storage.

Secondary copies include point-in-time data and are typically intended for long-term retention (e.g., weeks, months or years) before some or all of the data is moved to other storage or is discarded. Secondary copies may be indexed so users can browse and restore the data at another point in time. After certain primary copy data is backed up, a pointer or other location indicia such as a stub may be placed in the primary copy to indicate the current location of that data.

One type of secondary copy is a backup copy. A backup copy is generally a point-in-time copy of the primary copy data stored in a backup format, as opposed to a native application format. For example, a backup copy may be stored in a backup format that facilitates compression and/or efficient long-term storage. Backup copies generally have relatively long retention periods and may be stored on media with slower retrieval times than other types of secondary copies and media. In some cases, backup copies may be stored at on offsite location.

Another form of secondary copy is a snapshot copy. From an end-user viewpoint, a snapshot may be thought of as an instant image of the primary copy data at a given point in time. A snapshot generally captures the directory structure of a primary copy volume at a particular moment in time and may also preserve file attributes and contents. In some embodiments, a snapshot may exist as a virtual file system, parallel to the actual file system. Users typically gain read-only access to the record of files and directories of the snapshot. By electing to restore primary copy data from a snapshot taken at a given point in time, users may also return the current file system to the state of the file system that existed when the snapshot was taken.

A snapshot may be created instantly, using a minimum amount of file space, but may still function as a conventional file system backup. A snapshot may not actually create another physical copy of all the data, but may simply create pointers that are able to map files and directories to specific disk blocks.

In some embodiments, once a snapshot has been taken, subsequent changes to the file system typically do not overwrite the blocks in use at the time of the snapshot. Therefore, the initial snapshot may use only a small amount of disk space needed to record a mapping or other data structure representing or otherwise tracking the blocks that correspond to the current state of the file system. Additional disk space is usually required only when files and directories are actually modified later. Furthermore, when files are modified, typically only the pointers which map to blocks are copied, not the blocks themselves. In some embodiments, for example in the case of copy-on-write snapshots, when a block changes in primary storage, the block is copied to secondary storage before the block is overwritten in primary storage. The snapshot mapping of file system data is also updated to reflect the changed block(s) at that particular point in time.

An HSM copy is generally a copy of the primary copy data but typically includes only a subset of the primary copy data that meets a certain criteria and is usually stored in a format other than the native application format. For example, an HSM copy may include data from the primary copy that is larger than a given size threshold or older than a given age threshold and that is stored in a backup format. Often, HSM data is removed from the primary copy, and a stub is stored in the primary copy to indicate the new location of the HSM data. When a user requests access to the HSM data that has been removed or migrated, systems use the stub to locate the data and often make recovery of the data appear transparent, even though the HSM data may be stored at a location different from the remaining primary copy data.

An archive copy is generally similar to an HSM copy. However, the data satisfying criteria for removal from the primary copy is generally completely removed with no stub left in the primary copy to indicate the new location (i.e., where the archive copy data has been moved to). Archive copies of data are generally stored in a backup format or other non-native application format. In addition, archive copies are generally retained for very long periods of time (e.g., years) and, in some cases, are never deleted. In certain embodiments, such archive copies may be made and kept for extended periods in order to meet compliance regulations or for other permanent storage applications.

In some embodiments, application data over its lifetime moves from more expensive quick access storage to less expensive slower access storage. This process of moving data through these various tiers of storage is sometimes referred to as information lifecycle management ("ILM"). This is the process by which data is "aged" from forms of primary storage with faster access/restore times down through less expensive secondary storage with slower access/restore times. For example, such aging may occur as data becomes less important or mission critical over time.

Similar data transfers associated with location-specific criteria are performed when restoring data from secondary storage to primary storage. For example, to restore data a user or system process generally must specify a particular secondary storage device, piece of media, or archive file. Thus, the precision with which conventional storage management systems perform storage operations on electronic data is generally limited by the ability to define or specify storage operations based on data location.

Systems and modules described herein may comprise software, firmware, hardware, or any combination(s) of software, firmware, or hardware suitable for the purposes described herein. Software and other modules may reside on servers, workstations, personal computers, computerized tablets, PDAs, and other devices suitable for the purposes described herein. Software and other modules may be accessible via local memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, command line interfaces, and other interfaces suitable for the purposes described herein.

Embodiments of the invention are also described above with reference to flow chart illustrations and/or block diagrams of methods, apparatus (systems) and computer program products. It will be understood that each block of the flow chart illustrations and/or block diagrams, and combinations of blocks in the flow chart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the acts specified in the flow chart and/or block diagram block or blocks.

These computer program instructions may also be stored in a computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded onto a computer or other programmable data processing apparatus to cause a series of operations to be performed on the computer or other programmable apparatus to produce a computer implemented process such that the instructions which execute on the computer or other programmable apparatus provide steps for implementing the acts specified in the flow chart and/or block diagram block or blocks.

While certain embodiments of the inventions have been described, these embodiments have been presented by way of example only, and are not intended to limit the scope of the disclosure. Indeed, the novel methods and systems described herein may be embodied in a variety of other forms; furthermore, various omissions, substitutions and changes in the form of the methods and systems described herein may be made without departing from the spirit of the disclosure. The accompanying claims and their equivalents are intended to cover such forms or modifications as would fall within the scope and spirit of the disclosure.

What is claimed is:

1. A distributed deduplicated storage system comprising:
a client device; and
one or more hardware processors configured with software instructions to perform operations of:
 a data media agent, wherein the data media agent is configured to:
  receive data from the client device,
  split the data into at least first and second data blocks, and
  transmit in parallel the first data block to a first deduplication database media agent and the second data block to a second deduplication database media agent;
 the first deduplication database media agent having first deduplication management information associated therewith, wherein the first deduplication management information is stored separately from deduplicated data stored in secondary storage devices, the first deduplication database media agent configured to:
  determine whether the first data block is stored in a secondary storage device by querying the first deduplication management information; and the second deduplication database media agent having second deduplication management information associated therewith, wherein the second deduplication management information is stored separately from the deduplicated data stored in the secondary storage devices, the second deduplication database media agent configured to:
determine whether the second data block is stored in a secondary storage device by querying the second deduplication management information.

2. The distributed deduplicated storage system of claim 1, wherein the data transmitted to the data media agent is a file.

3. The distributed deduplicated storage system of claim 1, wherein the data transmitted to the data media agent includes two or more files.

4. The distributed deduplicated storage system of claim 1, wherein the first deduplication database media agent generates a first hash signature of the first data block, the second deduplication database media agent generates a second hash signature of the second data block.

5. The distributed deduplicated storage system of claim 4, wherein the first deduplication database media agent stores a copy of the second hash signature.

6. The distributed deduplicated storage system of claim 1, further including a plurality of data media agents, wherein the plurality of data media agents are in communication with one another and in communication with a plurality of deduplication database media agents.

7. The distributed deduplicated storage system of claim 6, wherein a first data media agent receives a request from the client device to restore a file comprising of one or more data blocks stored on two or more data media agents.

8. The distributed deduplicated storage system of claim 7, wherein the first data media agent transmits a first hash signature of the first data block to the second data media agent.

9. A distributed deduplicated storage system comprising:
a plurality of deduplication nodes each comprising one or more processors, one or more deduplication databases, and one or more storage devices, wherein the plurality of deduplication nodes are in communication with one another;
a first deduplication node of the plurality of deduplication nodes creates a first hash signature of a first data block of a plurality of data blocks associated with a file, wherein a copy of the first hash signature is stored in a first deduplication database, wherein the first deduplication database is stored separately from data stored on the one or more storage devices;
a first media agent that stores a copy of the first data block;
a second media agent that stores a copy of a second data block;
a second deduplication node of the plurality of deduplication nodes creates a second hash signature of the second data block associated with the file,
wherein the first deduplication node stores a copy of the second hash signature in a second deduplication database, wherein the second deduplication database is stored separately from data stored on the one or more storage devices; and
computer hardware configured to:
receive a request for the file comprised of the plurality of data blocks,
determine with the first deduplication node that the copy of the second data block was stored based at least in part on accessing the copy of the second hash signature, and
send a second request for the second data block.

10. The distributed deduplicated storage system of claim 9 wherein the second media agent is configured to respond to the second request using a file-transfer protocol (FTP)-based service routine.

11. The distributed deduplicated storage system of claim 9 wherein the second media agent is configured to perform the request using a hyper-text transfer protocol (HTTP)-based service routine.

12. The distributed deduplicated storage system of claim 9 wherein the second media agent transmits a copy of the second data block to the first media agent in response to the second request for the second data block.

13. The distributed deduplicated storage system of claim 9 wherein the first deduplication node further provides a path identifier associated with the second data block to the second media agent.

14. The distributed deduplicated storage system of claim 9 further comprising determining which of the plurality of deduplication nodes to send a request comprises performing a modulo operation on the second hash signature of the second data block.

15. The distributed deduplicated storage system of claim 9, the plurality of deduplication nodes are in communication with the first media agent and the second media agent.

16. The distributed deduplicated storage system of claim 9, wherein a first data media agent receives a request from a client device to restore a file comprising of one or more data blocks stored on two or more data media agents.

17. The distributed deduplicated storage system of claim 9, wherein the first data media agent transmits the first hash signature of the first data block to the second data media agent.

18. The distributed deduplicated storage system of claim 9, wherein the first media agent stores a copy of the second hash signature.

* * * * *